(12) United States Patent
Omata et al.

(10) Patent No.: US 9,473,059 B2
(45) Date of Patent: Oct. 18, 2016

(54) CONTROL APPARATUS FOR AC MOTOR

(71) Applicant: DENSO CORPORATION, Kariya, Aichi-pref. (JP)

(72) Inventors: Ryuji Omata, Anjo (JP); Takahumi Oowada, Kariya (JP)

(73) Assignee: DENSO CORPORATION, Kariya (JP)

( * ) Notice: Subject to any disclaimer, the term of this patent is extended or adjusted under 35 U.S.C. 154(b) by 71 days.

(21) Appl. No.: 14/533,411

(22) Filed: Nov. 5, 2014

(65) Prior Publication Data

US 2015/0123577 A1  May 7, 2015

(30) Foreign Application Priority Data

Nov. 5, 2013  (JP) .................. 2013-229563

(51) Int. Cl.
*H02P 21/14* (2016.01)
*H02P 6/08* (2016.01)
(Continued)

(52) U.S. Cl.
CPC ........... *H02P 21/148* (2013.01); *B60L 3/0061* (2013.01); *B60L 7/14* (2013.01); *B60L 11/005* (2013.01); *B60L 11/14* (2013.01); *B60L 15/025* (2013.01); *B60L 15/20* (2013.01);
(Continued)

(58) Field of Classification Search
CPC .... H02P 21/0035; H02P 21/14; H02P 27/06; H02P 6/002; H02P 6/08; H02P 21/148; H02P 31/00; H02P 21/00; H02P 2205/01; H02P 23/005; H02P 23/14; H02P 5/747; H02P 6/001; H02P 9/30
USPC ....................... 318/400.02, 400.07
See application file for complete search history.

(56) References Cited

U.S. PATENT DOCUMENTS 5,047,699 A * 9/1991 Rozman .................. F02N 11/04
                                                            318/400.07
6,137,258 A * 10/2000 Jansen .................... H02P 6/185
                                                            318/802

(Continued)

FOREIGN PATENT DOCUMENTS

JP      9-107602        4/1997
JP      2000-023499     1/2000

(Continued)

OTHER PUBLICATIONS

Office Action (2 pgs.) dated Oct. 6, 2015 issued in corresponding Japanese Application No. 2013-229563 with an at least partial English language translation (2 pgs.).

*Primary Examiner* — Bentsu Ro
(74) *Attorney, Agent, or Firm* — Nixon & Vanderhye P.C.

(57) ABSTRACT

A control apparatus controls an AC motor by detecting current passing through one phase. The apparatus includes an upper controller which includes a torque command calculation section, and a torque monitoring section monitoring torque to determine whether the torque is within a range, and a lower controller which controls current supply to an inverter based on a torque command value to control the motor, and which acquires information on a current-supply state and a rotation state of the motor and transmits information on a control state to the upper controller. At least one of the controllers estimates a current estimate value of an estimated phase or a d-q axis current estimate value based on a current detection value of the one phase and an electrical angle, and calculates information for monitoring torque based on the current estimate value. The torque monitoring section monitors the torque based on the information.

6 Claims, 17 Drawing Sheets

(51) Int. Cl.
*B60L 3/00* (2006.01)
*B60L 7/14* (2006.01)
*B60L 11/00* (2006.01)
*B60L 11/14* (2006.01)
*B60L 15/02* (2006.01)
*B60L 15/20* (2006.01)

(52) U.S. Cl.
CPC .......... *B60L 15/2009* (2013.01); *H02P 21/20* (2016.02); *B60L 2210/14* (2013.01); *B60L 2210/40* (2013.01); *B60L 2220/14* (2013.01); *B60L 2240/12* (2013.01); *B60L 2240/421* (2013.01); *B60L 2240/423* (2013.01); *B60L 2240/425* (2013.01); *B60L 2240/427* (2013.01); *B60L 2240/429* (2013.01); *B60L 2240/441* (2013.01); *B60L 2240/443* (2013.01); *B60L 2250/26* (2013.01); *B60L 2260/44* (2013.01); *Y02T 10/643* (2013.01); *Y02T 10/70* (2013.01); *Y02T 10/7022* (2013.01); *Y02T 10/7077* (2013.01); *Y02T 10/7225* (2013.01); *Y02T 10/7241* (2013.01); *Y02T 10/7275* (2013.01)

(56) References Cited

U.S. PATENT DOCUMENTS

| 7,598,698 B2 * | 10/2009 | Hashimoto .................. 318/798 |
| 2008/0079385 A1 | 4/2008 | Hashimoto et al. |
| 2013/0214709 A1 | 8/2013 | Omata et al. |
| 2013/0214712 A1 | 8/2013 | Omata et al. |
| 2013/0214713 A1 | 8/2013 | Omata et al. |
| 2014/0117893 A1 | 5/2014 | Omata et al. |

FOREIGN PATENT DOCUMENTS

| JP | 2004-159391 | 6/2004 |
| JP | 2008-086139 | 4/2008 |
| JP | 2012-257360 | 12/2012 |
| JP | 2013-172592 | 9/2013 |
| JP | 2013-172593 | 9/2013 |
| JP | 2013-172594 | 9/2013 |
| JP | 2014-113026 | 6/2014 |

* cited by examiner

CONTROL APPARATUS FOR AC MOTOR

CROSS-REFERENCE TO RELATED APPLICATION

This application is based on and claims the benefit of priority from earlier Japanese Patent Application No. 2013-229563 filed Nov. 5, 2013, the description of which is incorporated herein by reference.

BACKGROUND

1. Technical Field

The present invention relates to a control apparatus for an alternate-current (AC) motor that controls current supply to the AC motor by detecting a current of one phase among multiple phases by using a current sensor.

2. Related Art

From a societal need of low fuel consumption and low exhaust emission, electric cars and hybrid cars mounting an AC motor as a power source of the cars are now gaining attention. For example, in a hybrid car, a direct-current (DC) power source composed such as of a secondary battery is connected to an AC motor via a power converter which is configured such as by an inverter. A DC voltage outputted from the DC power source is converted to an AC voltage by the inverter to thereby drive the AC motor.

Such a hybrid car or an electric car is mounted with a control apparatus used for the AC motor. According to a known technique, the control apparatus includes an upper control unit and a lower control unit. The upper control unit acquires signals, such as an accelerator signal and a brake signal produced by the car's driver, and calculates a torque command value according to an operating state of the car. The lower control unit controls the driving of the AC motor on the basis of the torque command value given from the upper control unit. The upper and lower control units communicate with each other to monitor the occurrence of any abnormality in the control.

For example, Patent document JP-A-2000-023499 discloses a motor control apparatus including a motor control CPU, serving as a lower control unit, which calculates d-axis current and q-axis current (d-q axis currents). Of the d-q axis currents, the q-axis current contributing to torque is transmitted to a vehicle control CPU, serving as an upper control unit, for comparison with upper and lower limits of a torque command. As a result of the comparison, it is determined whether the direction of the output torque is correct or not to monitor whether the motor control CPU is performing the calculation correctly.

On the other hand, Patent document JP-A-2008-086139 or JP-A-2004-159391 discloses a technique related to one-phase control. In performing one-phase control, a current sensor for detecting a phase current supplied to an AC motor is provided to one phase alone. A current estimate value calculated based on a current detection value of the one phase is fed back in a lower control unit to control current supply to the AC motor. Thus, the provision of the current sensor to one phase alone can contribute to reducing the number of current sensors, reducing the size of an inverter in the vicinity of its output terminals of the three phases, and reducing the cost incurred in the control system of the AC motor.

In the abnormality monitoring of output torque performed by the apparatus of Patent document JP-A-2000-023499, the U-, V- and W-phase currents are detected from the current outputted from the inverter to the motor and inputted to a feedback conversion section. In other words, this apparatus is configured on the premise of providing a current sensor to each of the three phases. A technique of using Kirchhoff's law may be applied to this case. Specifically, detection values of the current sensors of two phases may be used as bases for the calculation of the current value of the remaining one phase using Kirchhoff's law. However, still, the apparatus is configured on the premise of performing feedback control based on the current detection values of at least two phases. Therefore, this configuration cannot be applied to a control apparatus that is configured to perform feedback control on the basis of a current detection value of one phase among three phases.

Regarding one-phase control, patent document JP-A-2008-086139 proposes a technique in which, of the three-phase current command values obtained through reverse d-q conversion of the d-axis current command and the q-axis current command (d-q axis current commands), the current command values of two phases other than the sensor phase are used as they are as the current estimate values of the two phases. Another patent document JP-A-2004-159391 proposes a technique of using a current phase angle of a sensor phase, which is obtained by adding the current command phase angles of the d-q axis current command values to the electrical angle of the sensor phase. Using the obtained current phase angle, the current values of the two phases other than the sensor phase are estimated. Thus, the d-q axis current command values are converted to angles on a coordinate and the converted angles are used as they are.

In this way, in the technique of one-phase control proposed in patent document JP-A-2008-086139 or JP-A-2004-159391, current command values are used, as they are, instead of detection values, for compensation of the information which is insufficient due to the use of the current detection value of one phase alone. In other words, since the estimate values are not basically calculated based on the detection values, it is difficult to correctly derive the actual state of a real machine. Therefore, the output torque cannot be properly monitored on the basis of such estimate values.

Further, in the apparatus disclosed in Patent document JP-A-2000-023499, only the q-axis current is transmitted from the lower control unit to the upper control unit. Accordingly, basically, the upper control unit can merely determine the direction of the output torque on the basis of the positive/negative sign of the q-axis current. In the case of an IPM (implanted permanent magnet) type AC motor in particular, the information on the q-axis current alone does not enable correct estimation of the output torque for the determination of abnormality, except for the abnormality that the value of the output torque is deviated to a great extent from command torque.

SUMMARY

An embodiment provides a control apparatus for an AC motor. The control apparatus includes an upper control unit that calculates a torque command value for the AC motor, and a lower control unit that detects a current of one phase among multiple phases to control current supply to the AC motor. The upper control unit properly monitors output torque of the AC motor on the basis of information derived from the lower control unit.

As an aspect of the embodiment, a control apparatus for an AC motor is provided. The control apparatus controls driving of the AC motor by having a current sensor detect current passing through one phase serving as a sensor phase among multiple phases. The apparatus includes: an upper control unit which includes a torque command calculation section calculating a torque command value for the AC motor, and an output torque monitoring section monitoring output torque to determine whether or not the output torque of the AC motor is within a normal range, relative to the torque command value; and a lower control unit which communicates with the upper control unit, and controls current supply to an inverter based on a torque command value received from the upper control unit to control driving of the AC motor, and which acquires information on a current-supply state and a rotation state of the AC motor and transmits information on a control state to the upper control unit. At least one of the upper control unit and the lower control unit estimates a current estimate value of an estimated phase, which is other than the sensor phase, or a d-q axis current estimate value based on a current detection value of the one phase serving as the sensor phase and an electrical angle of the AC motor, and calculates monitoring information used for monitoring output torque based on the current estimate value. The output torque monitoring section monitors the output torque based on the monitoring information.

DETAILED DESCRIPTION OF THE PREFERRED EMBODIMENTS

With reference to the accompanying drawings, hereinafter are described embodiments of a control apparatus for an alternating-current (AC) motor.

Figure 1:
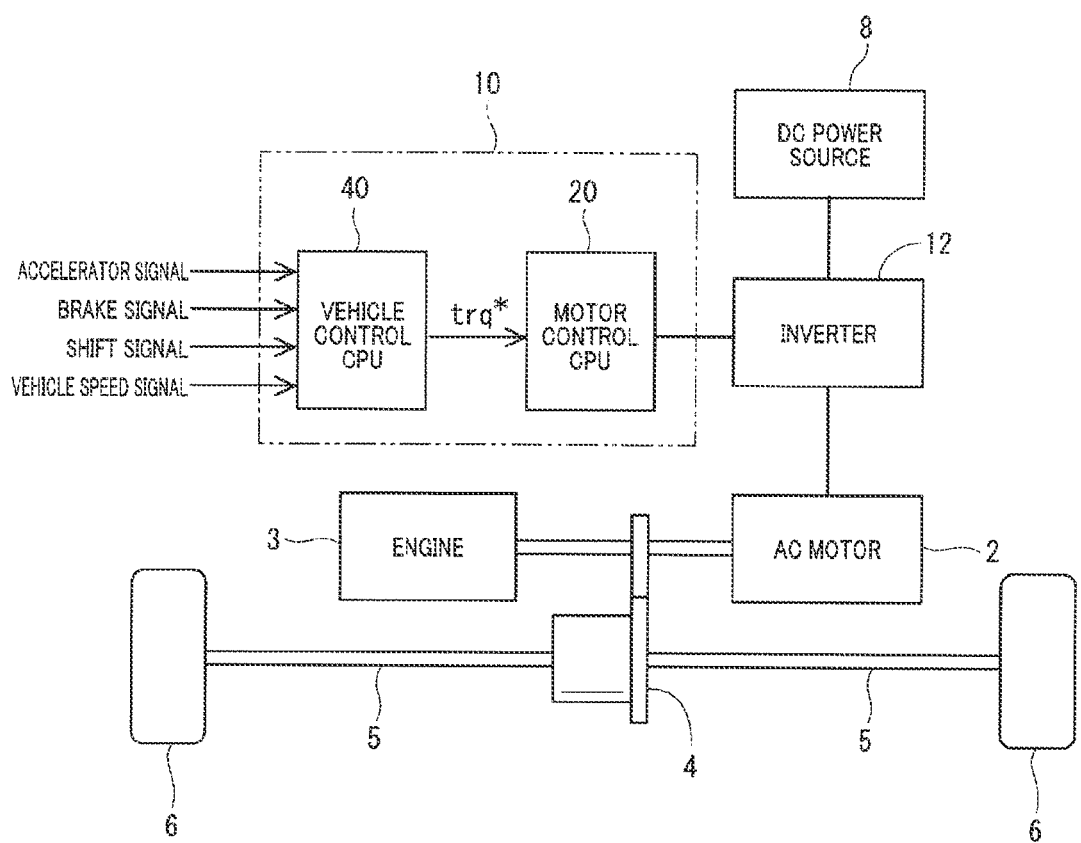
FIG. 1 is a schematic diagram illustrating a configuration of a drive system of a hybrid car, to which a control apparatus for an AC motor according to an embodiment is applied.
Figure 2:
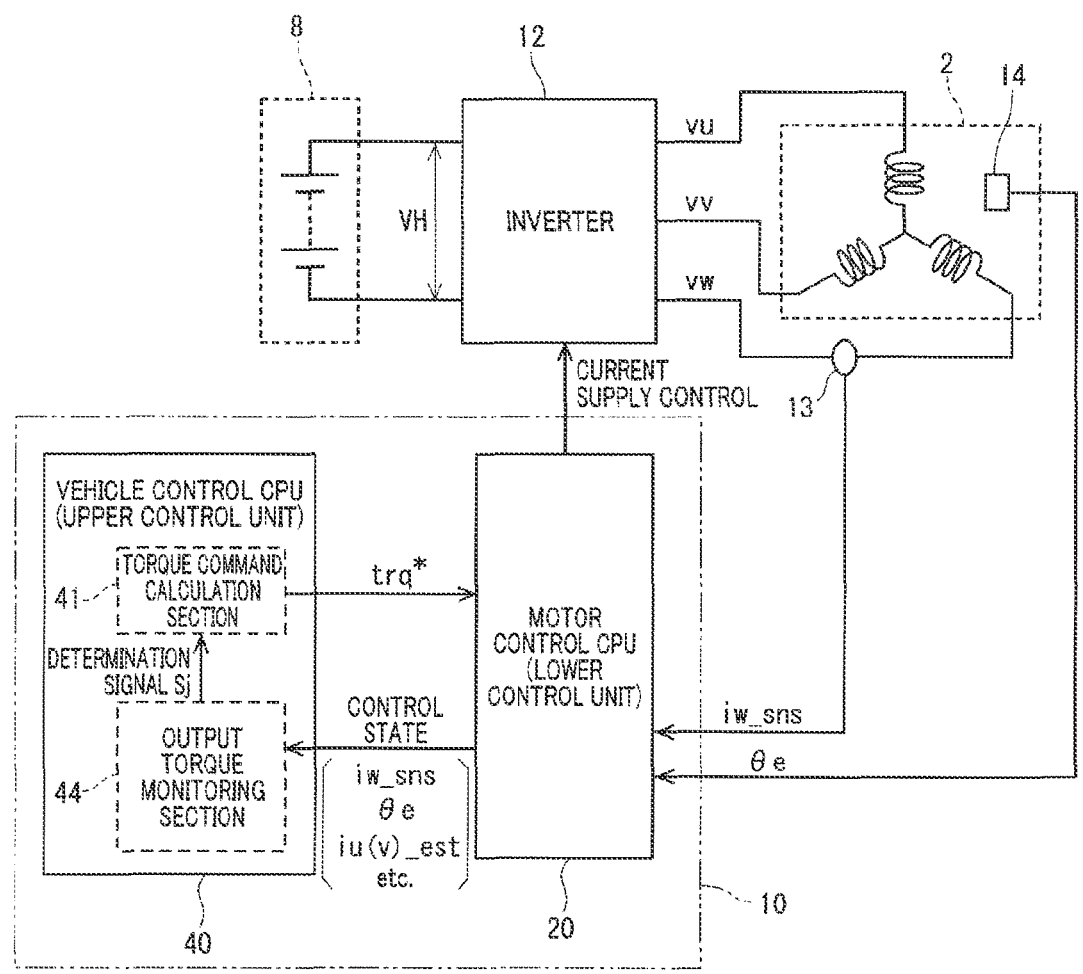
FIG. 2 is a schematic diagram generally illustrating a configuration of the control apparatus.

First, referring to FIGS. 1 and 2, a configuration common to the embodiments is described. In these embodiments, a motor control apparatus 10 serving as the "control apparatus for an AC motor" is applied to a system that drives a hybrid car.

[Configuration of Control Apparatus for AC Motor]

FIG. 1 is a diagram illustrating a drive system of the hybrid car, to which a control apparatus 10 of an AC motor 2 is applied. FIG. 2 is a schematic diagram generally illustrating the control apparatus 10. As shown in FIG. 1, the drive system of the hybrid car includes the AC motor 2, an inverter 12, a direct-current (DC) power source 8 and the motor control apparatus 10.

The AC motor 2 generates torque for driving drive wheels 6, for example, of an electric vehicle. The AC motor 2 of the embodiments is a permanent magnet synchronous three-phase (polyphase, multiphase) AC motor.

It should be noted that electric vehicles include, for example, hybrid cars, electric cars and fuel-cell cars, in which the drive wheels 6 are driven by electric energy. The electric vehicle of the embodiments is a hybrid vehicle provided with an engine 3. Thus, the AC motor 2 is a so-called motor-generator (marked as "MG" in the drawings) having a function of a motor that generates torque for driving the drive wheels 6, and a function of a generator that is driven by the vehicle's kinetic energy transmitted from the engine 3 and the drive wheels 6 to enable electric power generation.

The AC motor 2 is connected to an axle shaft 5 via, for example, a gear 4, such as a speed-change gear. Thus, the torque generated by driving the AC motor 2 rotates the axle shaft 5 via the gear 4 to thereby drive the drive wheels 6.

The DC power source 8 is an electric storage device including, for example, a secondary battery such as of nickel hydride or lithium ion, or an electric double layer capacitor, which is capable of charge and discharge. The DC power source 8 is connected to the inverter 12 and configured to enable transmission/reception of electric power to/from the AC motor 2 via the inverter 12.

The motor control apparatus 10 includes a vehicle control CPU 40 serving as the "upper control unit" and a motor control CPU 20 serving as the "lower control unit". Each of the vehicle control CPU 40 and the motor control CPU 20 is mainly configured by a microcomputer, and includes therein, although not shown, a CPU, a ROM and an I/O unit, as well as a bus line connecting between these components. The vehicle control CPU 40 and the motor control CPU 20 communicate with each other.

The reference numbers 10, 20 and 40 designated to the motor control apparatus, the motor control CPU and the vehicle control CPU, respectively, and corresponding to reference numbers 101, 201 and 401 in the embodiments discussed later are used as reference numbers common to all embodiments.

The vehicle control CPU 40 performs software processing by executing programs stored in advance and hardware processing using a dedicated electronic circuit to entirely control the electric vehicle.

The vehicle control CPU 40 acquires an accelerator signal from an accelerator sensor, a brake signal from a brake switch and a shift signal from a shift switch, as well as signals, such as a vehicle speed signal, from various sensors, switches and the like, and detects the operating state of the vehicle on the basis of these signals and the like. These components are not shown in the drawings. Then, a torque command calculation section 41 (see FIG. 2) calculates a torque command value trq* according to the operating state and transmits the calculated command value to the motor control CPU 20.

The vehicle control CPU 40 outputs a command signal to an engine control circuit, not shown, to control the operation of the engine 3.

The motor control CPU 20 performs software processing and hardware processing on the basis of the torque command value trq* received from the vehicle control CPU 40. As a result of the processing, current supply to the inverter 12 is controlled to thereby control the driving of the AC motor 2.

A boost converter, not shown, boosts the voltage of the DC power source 8. As shown in FIG. 2, the boosted voltage serving as a system voltage VH is inputted to the inverter 12. The inverter 12 includes six switching elements, not shown, which are in a bridge connection. For example, the switching elements that can be used include IGBTs (insulated gate bipolar transistors), MOS (metal oxide semiconductor) transistors and bipolar transistors.

The motor control CPU 20 includes a PWM signal generation section 25 that outputs PWM signals UU, UL, VU, VL, WU and WL. Based on the PWM signals, the on/off state of the switching elements is controlled. Thus, the inverter 12 controls three-phase AC voltages vu, vv and vw applied to the AC motor 2. With the application of the three-phase AC voltages vu, vv and vw generated by the inverter 12, the driving of the AC motor 2 is controlled.

The drive system includes a current sensor 13 that detects a current of any one of the phases of the AC motor 2. In the embodiments, the current sensor 13 detects the current of the W phase. Hereinafter, the W phase for which the current sensor 13 detects a current is referred to as sensor phase. The current sensor 13 detects a current of the W phase as a current detection value iw_sns and outputs the current detection value to the motor control CPU 20.

The following description of the embodiments is given on the premise of a configuration in which the sensor phase is the W phase. However, in other embodiments, the sensor phase may be the U or V phase.

The drive system also includes a rotation angle sensor 14 which is provided near a rotor, not shown, of the AC motor 2 to detect an electrical angle $\theta e$ and output the detected electrical angle $\theta e$ to the motor control CPU 20. Based on the electrical angle $\theta e$ detected by the rotation angle sensor 14, the number of rotations (per unit time) N of the rotor of the AC motor 2 is calculated. Hereinafter, "the number of rotations N of the rotor of the AC motor 2" is simply referred to as "rotation number N of the AC motor 2".

The rotation angle sensor 14 of the embodiments is a resolver. Alternatively, however, a different type sensor, such as a rotary encoder, may be used in other embodiments.

The motor control CPU 20 acquires the current detection value iw_sns of the sensor phase detected by the current sensor 13 and the electrical angle $\theta e$ detected by the rotation angle sensor 14. The current detection value iw_sns of the sensor phase and the electrical angle $\theta e$ correspond to the "information on a current-supply state and a rotation state of the AC motor". The motor control CPU 20 calculates current estimate values of the phases other than the sensor phase, for example, to control current supply to the inverter 12.

The motor control CPU 20 permits the AC motor 2 to perform a powering operation as a motor to consume electric power, and a regenerative operation as a generator to generate electric power. These operations are performed according to the rotation number N of the AC motor 2, which is based on the electrical angle $\theta e$ detected by the rotation angle sensor 14, and the torque command value trq* derived from the vehicle control CPU 40. Specifically, depending on the rotation number N and whether the torque command value trq* is negative or positive, the operations are switched in the following four patterns.

<1. Forward Rotation Powering Operation>

Electric power is consumed when the rotation number N is positive and the torque command value trq* is positive.

<2. Forward Rotation Regenerative Operation>

Electric power is generated when the rotation number N is positive and the torque command value trq* is negative.

<3. Reverse Rotation Powering Operation>

Electric power is consumed when the rotation number N is negative and the torque command value trq* is negative.

<4. Reverse Rotation Regenerative Operation>

Electric power is generated when the rotation number N is negative and the torque command value trq* is positive.

When the rotation number N>0 (forward rotation) and the torque command value trq*>0 are satisfied, or when the rotation number N<0 (reverse rotation) and the torque command value trq*<0 are satisfied, the inverter 12 operates as follows. Specifically, with the switching operation of the switching elements, the inverter 12 converts the DC power supplied from the DC power source 8 to AC power so that the AC motor 2 is driven for the output of torque (performs powering operation).

On the other hand, when the rotation number N>0 (forward rotation) and the torque command value trq*<0 are satisfied, or when the rotation number N<0 (reverse rotation) and the torque command trq*>0 are satisfied, the inverter 12 operates as follows. Specifically, with the switching operation of the switching elements, the inverter 12 converts the AC power generated by the AC motor 2 to DC power for the supply of the DC power to the DC power source 8 to thereby perform regenerative operation.

The embodiments have a feature in that the "information on a control state", such as the current detection value iw_sns of the sensor phase, the electrical angle $\theta e$ and the current estimate values calculated based on these values, is transmitted from the motor control CPU 20 to the vehicle control CPU 40.

The vehicle control CPU 40 includes an output torque monitoring section 44 which monitors output torque, as discussed later, on the basis of the information on a control state transmitted from the motor control CPU 20 and transmits the results of the monitoring in the form of a determination signal Sj to the torque command calculation section 41.

[Configuration of Motor Control CPU]

Figure 3:
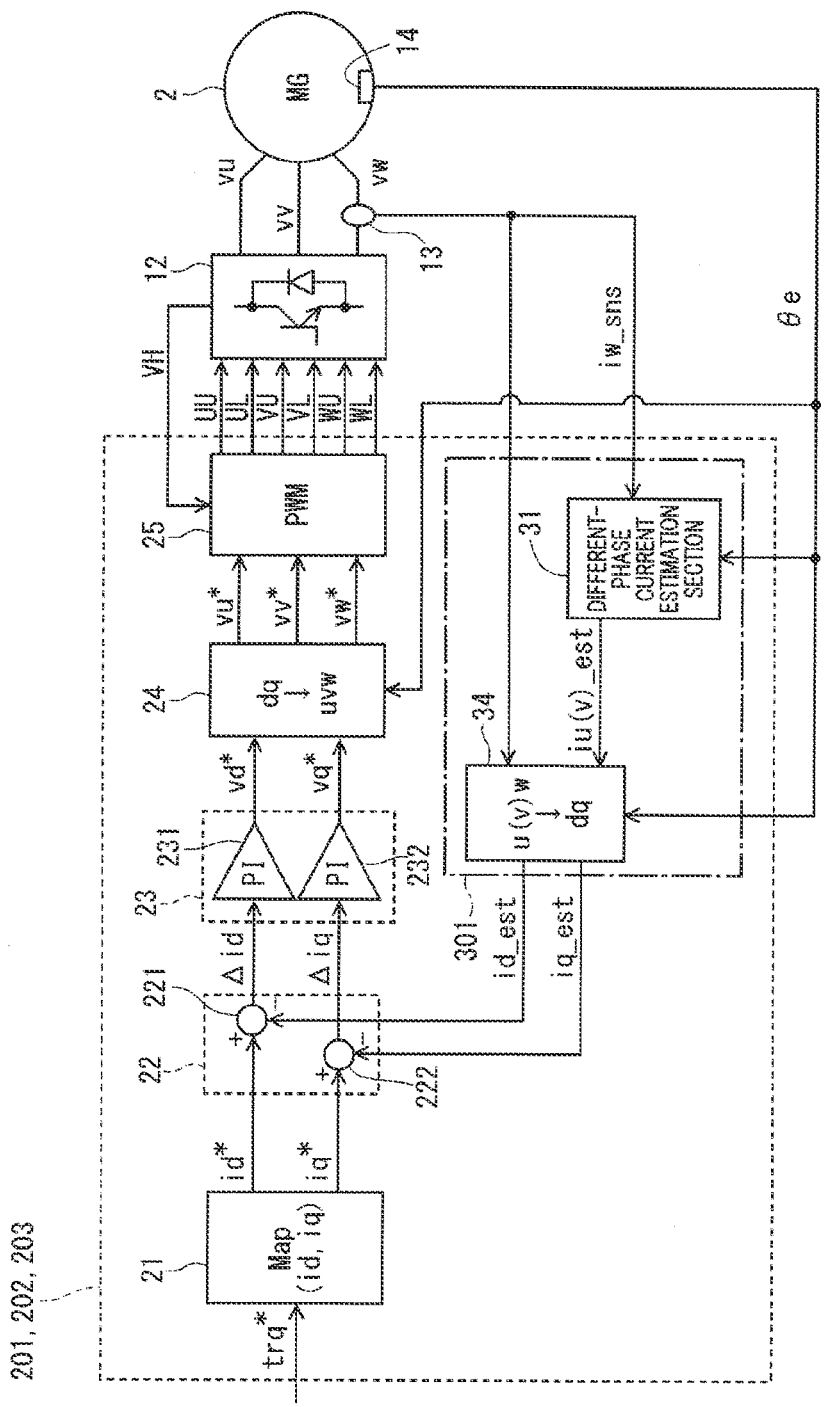
FIG. 3 is a block diagram illustrating a motor control CPU commonly used in motor control apparatuses according to first to third embodiments.
Figure 4:
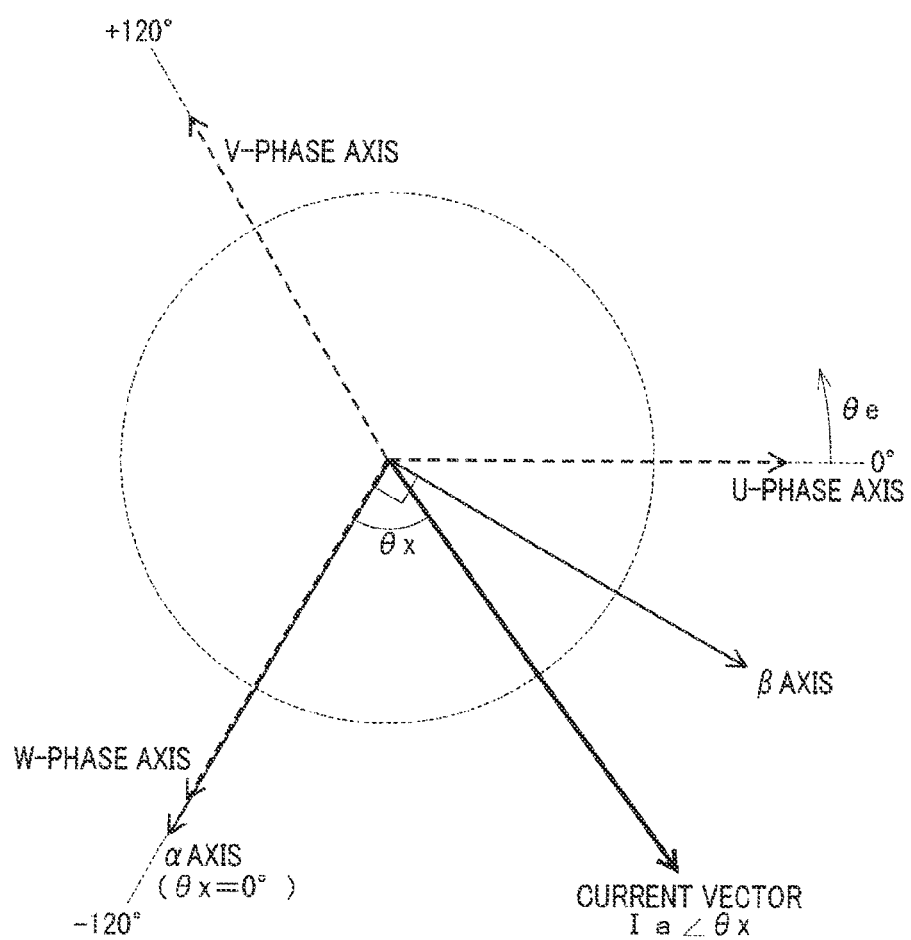
FIG. 4 is a diagram illustrating a fixed coordinate system (α-β coordinate system) based on a sensor phase.
Figure 5:
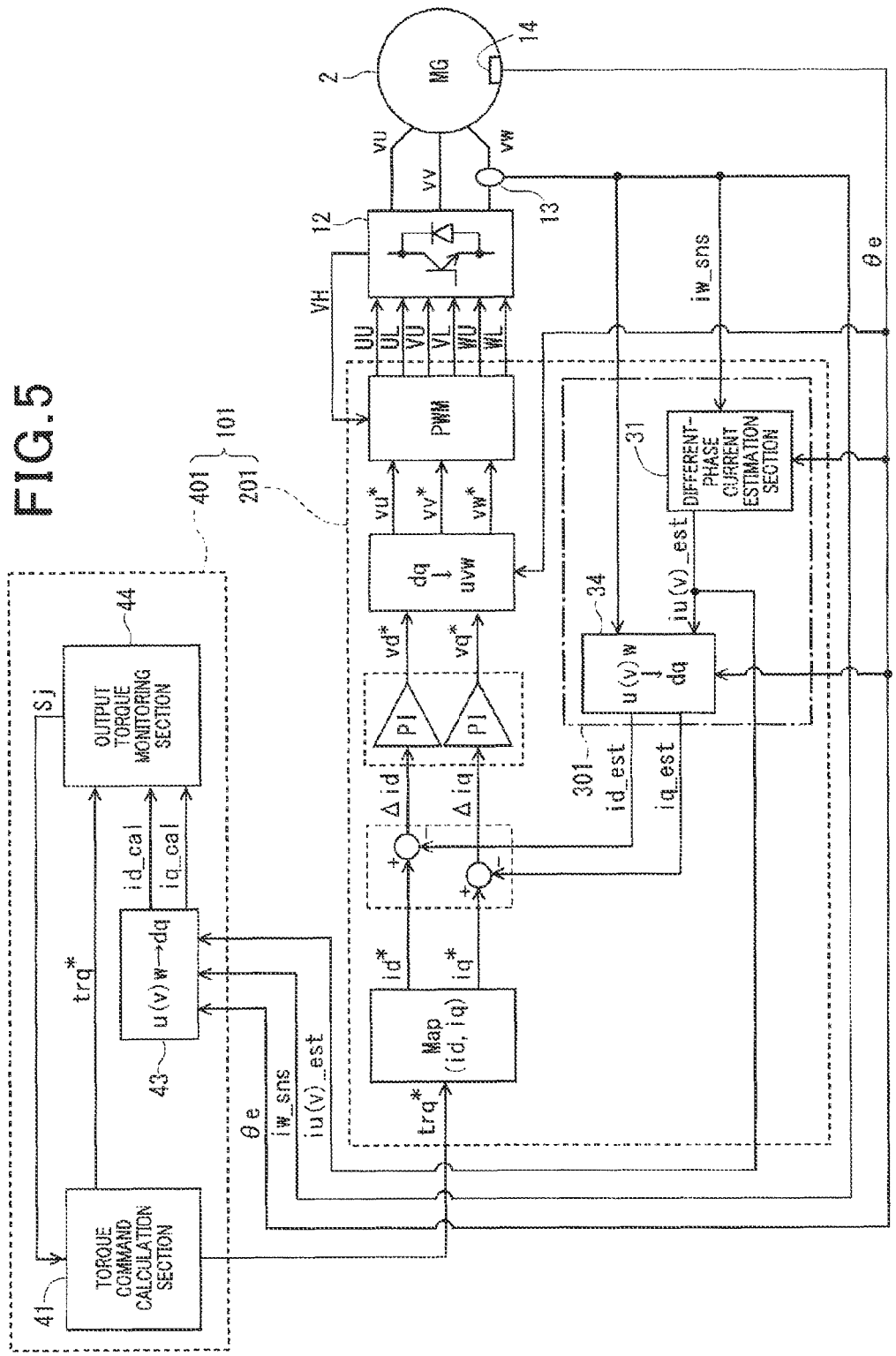
FIG. 5 is a block diagram illustrating a motor control apparatus according to the first embodiment.
Figure 11:
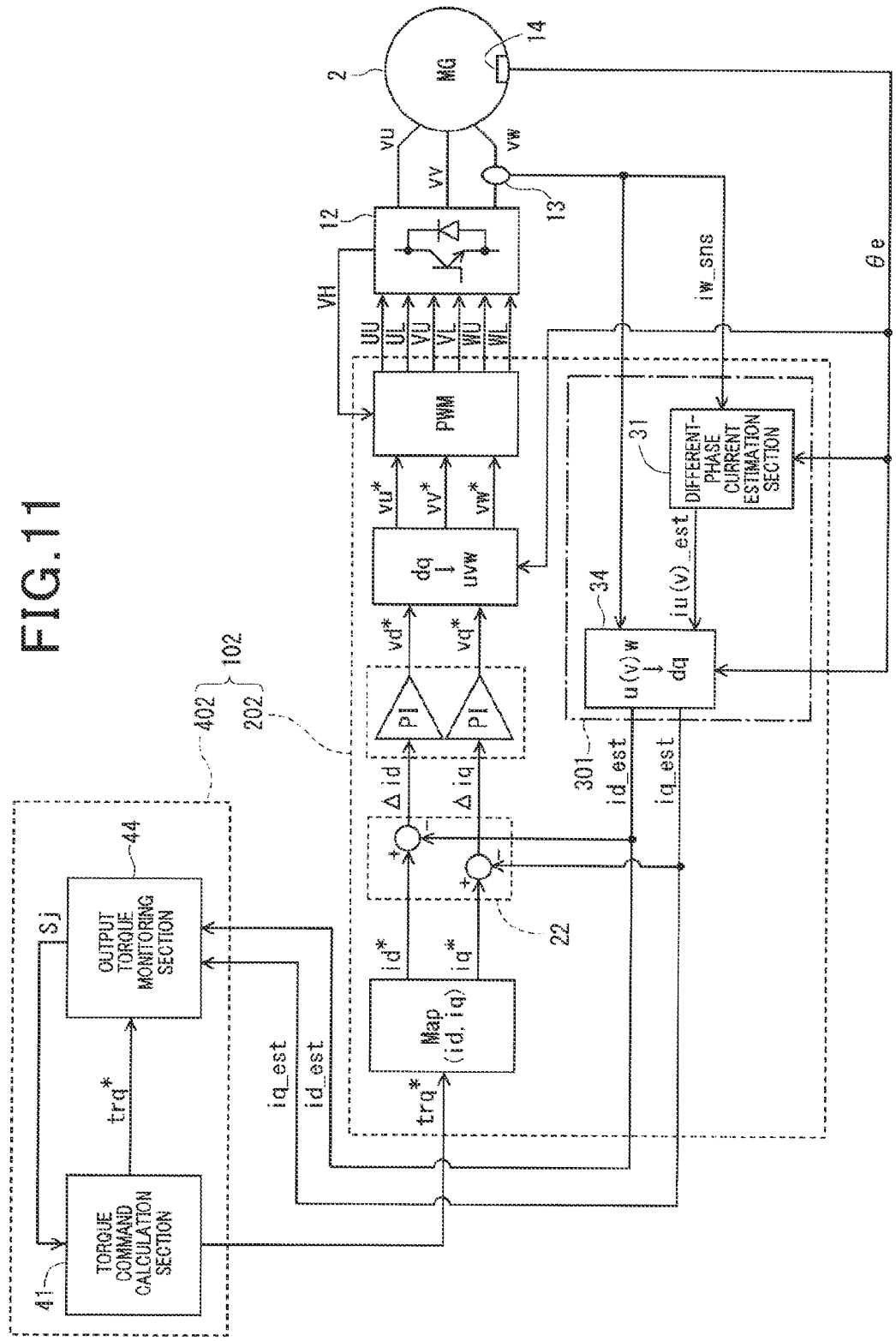
FIG. 11 is a block diagram of a motor control apparatus, according to the second embodiment.
Figure 13:
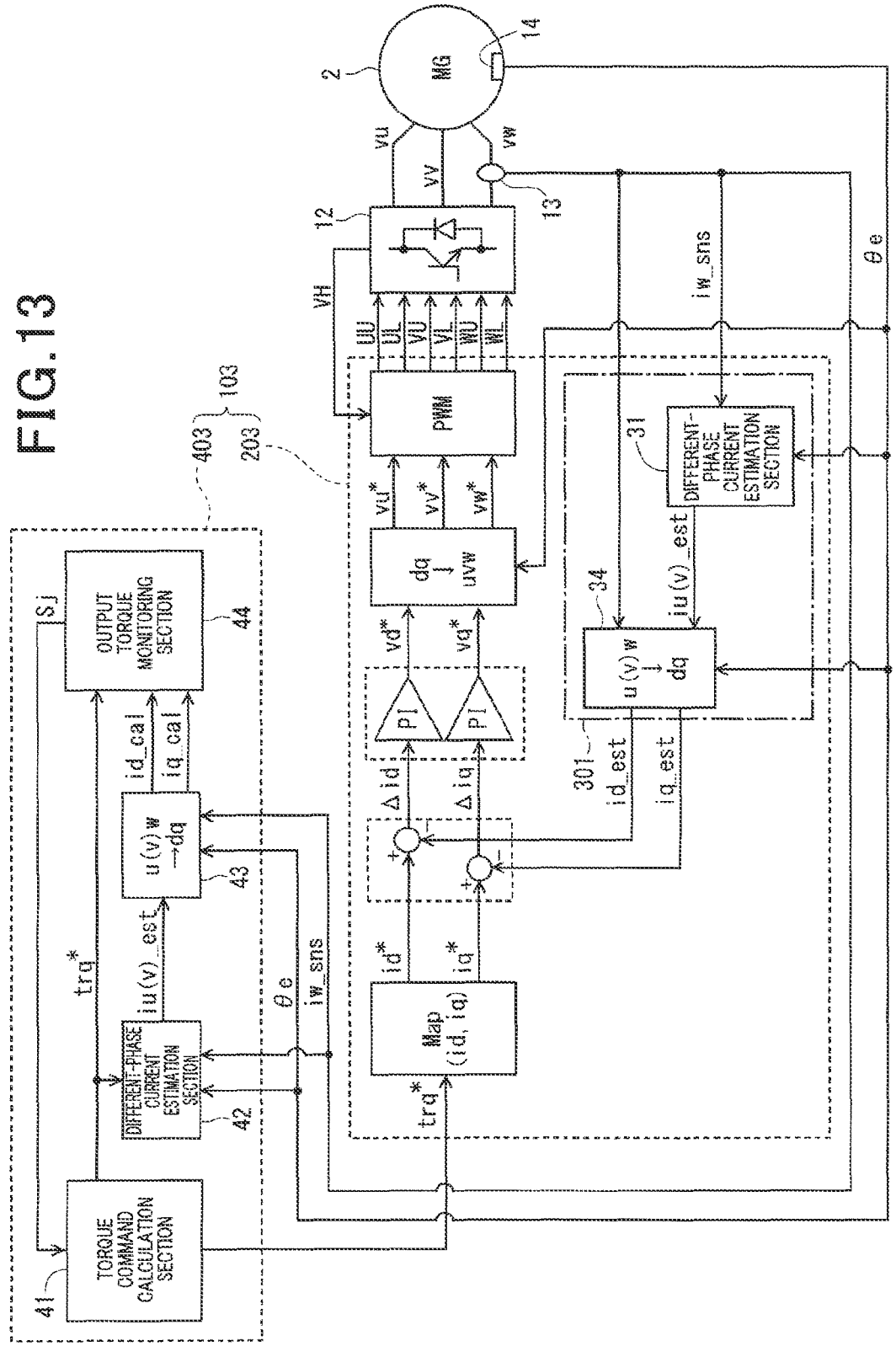
FIG. 13 is a block diagram of a motor control apparatus, according to the third embodiment.

Referring to FIGS. 3 and 4, a configuration of the motor control CPU 20 common to first to third embodiments is described. The motor control CPUs of the first, second and third embodiments are designated with reference numbers 201, 202 and 203, respectively. The motor control CPUs 201, 202 and 203 have an identical configuration in a range shown in FIG. 3. In FIGS. 5, 11 and 13 referred to in the later description, the "information on a control state" transmitted to the vehicle control CPU 40 is different depending on the motor control CPUs 201, 202 and 203.

FIG. 3 is a block diagram illustrating the motor control CPU common to the first to third embodiments. FIG. 4 is a diagram illustrating a fixed coordinate system (α-β coordinate system) based on a sensor phase.

As shown in FIG. 3, the motor control CPU 201, 202 or 203 includes a d-q axis current command value calculation section 21, a current subtracter (current subtraction section) 22, a PI (proportional plus integral) calculation section 23, a reverse d-q conversion section 24, a PWM signal generation section 25 and a current estimation section 301. The motor control CPU 201, 202 or 203 controls current supplied to the AC motor 2 under current feedback control. Under the current feedback control, d- and q-axis current estimate values (d-q axis current estimate values) id_est and iq_est are fed back for d- and q-axis current command values (d-q axis current command values) id* and iq*. The current feedback control includes a so-called sine wave control mode or an overmodulation control mode.

The d-q axis current command value calculation section 21 calculates the d-q axis current command values id* and iq* in a rotating coordinate system (d-q coordinate system) of the AC motor 2 on the basis of the torque command value trq* given by the vehicle control CPU 40. In the embodiments, the d-q axis current command values id* and iq* are calculated by referring to a map stored in advance. Alternatively, in another embodiment, the d-q axis current command values may be calculated using a formula or the like.

The current subtracter 22 includes a d-axis current subtractor 221 and a q-axis current subtractor 222. The d-axis current subtractor 221 calculates a d-axis current deviation Δid that is the difference between a d-axis current estimate value id_est calculated by and fed back from the current estimation section 301, and the d-axis current command value id*. The q-axis current subtractor 222 calculates a q-axis current deviation Δiq that is the difference between a q-axis current estimate value iq_est calculated by and fed back from the current estimations section 301, and the q-axis current command value iq*.

The PI calculation section 23 includes a d-axis PI calculator 231 and a q-axis PI calculator 232. The d-axis PI calculator 231 calculates a d-axis voltage command value vd* through PI calculation so that the d-axis current estimate value id_est should follow the d-axis current command value id*. Thus, in the calculation, the d-axis current deviation Δid is ensured to converge on zero. The q-axis PI calculator 232 calculates a q-axis voltage command value vq* through PI calculation so that the q-axis current estimate value iq_est should follow the q-axis current command value iq*. Thus, in the calculation, the q-axis current deviation Δiq is ensured to converge on zero.

The reverse d-q conversion section 24 converts the d- and q-axis voltage command values (d-q voltage command values) vd* and vq* to a U-phase voltage command value vu*, a V-phase voltage command value vv* and a W-phase voltage command value vw* on the basis of the electrical angle θe acquired from the rotation angle sensor 14.

The PWM signal generation section 25 calculates PWM signals UU, UL, VU, VL, WU and WL which are associated with the switching of the on/off-state of the switching elements of the inverter 12, on the basis of the three-phase voltage command values vu*, vv* and vw*, and the system voltage VH applied to the inverter 12.

Then, based on the PWM signals UU, UL, VU, VL, WU and WL, the on/off-state of the switching elements of the inverter 12 is controlled to thereby generate three-phase AC voltages vu, vv and vw. The three-phase AC voltages vu, vv and vw are then applied to the AC motor 2 to control the driving thereof. As a result, torque equivalent to the torque command value trq* is outputted.

The current estimation section 301 includes a different-phase current estimation section 31 and a d-q conversion section 34.

In a motor control apparatus in which the current sensor 13 is provided to each of two phases, the current of the remaining one phase having no current sensor 13 can be easily calculated using Kirchhoff's law (Formula (1)).

$$iu+iv+iw=0 \tag{1}$$

In contrast, in a control apparatus in which the current sensor 13 is provided to only one phase (W phase) serving as a sensor phase, the current of at least one of the phases other than the sensor phase is required to be estimated.

The different-phase current estimation section 31 of the current estimation section 301 estimates the current of either one of the U and V phases other than the sensor phase. Hereinafter, the phase whose current is estimated is referred to as estimated phase. In the following description, the U phase is chiefly treated as the estimated phase and the current estimate value of the estimated phase is indicated as iu(v)_est, with the V phase being bracketed. Similarly, in the d-q conversion section 34, an indication u(v)w→dq is used.

In the first to third embodiments, the d-q axis current command values id* and iq* are not inputted to the different-phase current estimation section 31 from the d-q axis current command value calculation section 21. This is a point different from a motor control CPU 204 of a fourth embodiment discussed later. Specifically, the different-phase current estimation section 31 has a feature of calculating the current estimate value iu(v)_est of the estimated phase through an estimation calculation without using the d-q axis current command values id* and iq*, or the three-phase current command values iu*, iv* and iw* obtained from the reverse d-q conversion of the d-q axis current command values id* and iq*.

The different-phase current estimation section 31 calculates a current estimate value of the phase which is different from the sensor phase on the basis of the information on the current detection value iw_sns of the sensor phase and the electrical angle θe. However, any calculation method may be used as far as the method can provide an estimate value that can figure out the actual state of the real machine. As an example, an estimation calculation method disclosed in JP-A-2013-172594 is explained. Details such as of deriving formulas are omitted.

This method has a following feature. Specifically, a sensor-phase reference current phase θx is calculated based on an α-axis current iα and a β-axis current βi in an α-β coordinate system. Then, based on the sensor-phase reference current phase θx, a current estimate value iu_est of the U phase serving as an estimated phase is calculated. As shown in FIG. 4, the α axis coincides with the axis of the W phase serving as a sensor phase, while the β axis is orthogonal to the α axis. The sensor-phase reference current phase θx is an angle which is made between the α axis and a current vector (Ia∠θx) of a current amplitude Ia, and in synchronization with the current detection value iw_sns of the sensor phase.

On the basis of the current detection value iw_sns of the sensor phase, an α-axis current detection value iα_sns is expressed by Formula (2).

$$i\alpha\_sns = K \times \frac{3}{2} \times iw\_sns \tag{2}$$

Then, a derivative value Δia of the α-axis current is calculated based on the "variation of the α-axis current iα relative to an electrical angle displacement Δθe rad."

between time points of calculating the α-axis current iα on the basis of the current detection value of the sensor phase. In other words, the derivative value Δiα of the α-axis current is calculated based on the "difference between a current-time value (present-time value, this-time value) and the previous-time value of the α-axis current iα". Formula (3) is used for the calculation.

$$\Delta i\alpha = -\{i\alpha(n) - i\alpha(n-1)\}\theta e \quad (3)$$

Then, taking account that the α-axis current iα and the β-axis current iβ are in the "sine wave and cosine wave" relationship and that the phase difference between the α-axis current iα and the β-axis current iβ is 90°, a β-axis current estimate value iβ_est is calculated on the basis of the derivative value Δiα of the α-axis current.

Subsequently, based on the α-axis current detection value iα_sns and the β-axis current estimate value iβ_est, the sensor-phase reference current phase θx is calculated using Formula (4).

$$\theta x = \tan^{-1}\left(\frac{i\beta\_est}{i\alpha\_sns}\right) \quad (4)$$

Then, when the estimated phase is the U phase, the current estimate value iu_est of the estimated phase is calculated on the basis of the sensor-phase reference current phase θx and the current detection value iw_sns of the sensor phase using Formula (5). The calculation may alternatively be conducted referring to a map.

$$\begin{aligned}
iu\_est &= Ia \times \sin(\theta x - 120°) \quad (5)\\
&= -\frac{1}{2} \times Ia \times \sin(\theta x) - \frac{\sqrt{3}}{2} \times Ia \times \cos(\theta x)\\
&= -\frac{1}{2} \times iw\_sns - \frac{\sqrt{3}}{2} \times \frac{Ia \times \sin(\theta x)}{\tan(\theta x)}\\
&= \left\{-\frac{1}{2} - \frac{\sqrt{3}}{2} \times \frac{1}{\tan(\theta x)}\right\} \times iw\_sns
\end{aligned}$$

The current estimate value iu_est of the estimated phase calculated in this way by the different-phase current estimation section 31 is outputted to the d-q conversion section 34. The d-q conversion section 34 caries out d-q conversion for the current estimate value iu_est of the estimated phase and the current detection value iw_sns of the sensor current on the basis of the electrical angle θe, using Formula (6) to thereby calculate the d-q axis current estimate values id_est and iq_est.

$$\begin{aligned}
\begin{bmatrix} id\_est \\ iq\_est \end{bmatrix} &= \sqrt{\frac{2}{3}} \quad (6)\\
&\begin{bmatrix} \cos(\theta e) - \cos(\theta e - 120°) & \cos(\theta e + 120°) - \cos(\theta e - 120°) \\ -\sin(\theta e) + \sin(\theta e - 120°) & -\sin(\theta e + 120°) + \sin(\theta e - 120°) \end{bmatrix}\\
&\begin{bmatrix} iu\_est \\ iw\_sns \end{bmatrix}\\
&= \sqrt{\frac{2}{3}} \times \sqrt{3} \begin{bmatrix} \cos(\theta e + 30°) & -\cos(\theta e + 90°) \\ -\sin(\theta e + 30°) & \sin(\theta e - 90°) \end{bmatrix}\begin{bmatrix} iu\_est \\ iw\_sns \end{bmatrix}\\
&= \sqrt{2}\begin{bmatrix} \sin(\theta e + 120°) & -\sin(\theta e) \\ \cos(\theta e + 120°) & -\sin(\theta e) \end{bmatrix}\begin{bmatrix} iu\_est \\ iw\_sns \end{bmatrix}
\end{aligned}$$

According to the estimation calculation method, the sensor-phase reference current phase θx is calculated on the basis of the α-axis current iα and the β-axis current iβ in a fixed coordinate system (α-β coordinate system) based on the sensor phase, and the current estimate value iu_est of the estimated phase is calculated on the basis of the sensor-phase reference current phase θx and the current detection value iw_sns of the sensor phase. Accordingly, the current estimate value iu_est of the estimated phase can be calculated with high accuracy, reflecting the actual state of a real machine influenced such as by the harmonic components of the actual current phase θx or fluctuations that could always occur.

[Configuration of Motor Control Apparatus]

Hereinafter is described, for each of the first, second and third embodiments, a general configuration of the motor control apparatus 10 as a combination of the motor control CPU 20 and the vehicle control CPU 40. First, second and third embodiments shown in FIGS. 5, 11 and 13, respectively, are distinguished from each other by suffixing numerals 1, 2 and 3, for example, to the motor control apparatus 10, the motor control CPU 20 and the vehicle control CPU 40, respectively. Further, in FIGS. 5, 11 and 13, the reference numbers designated to the components illustrated in FIG. 3 at an upper stage of the motor control CPU 201, 202 or 203 are omitted to save space.

First Embodiment

Figure 6:
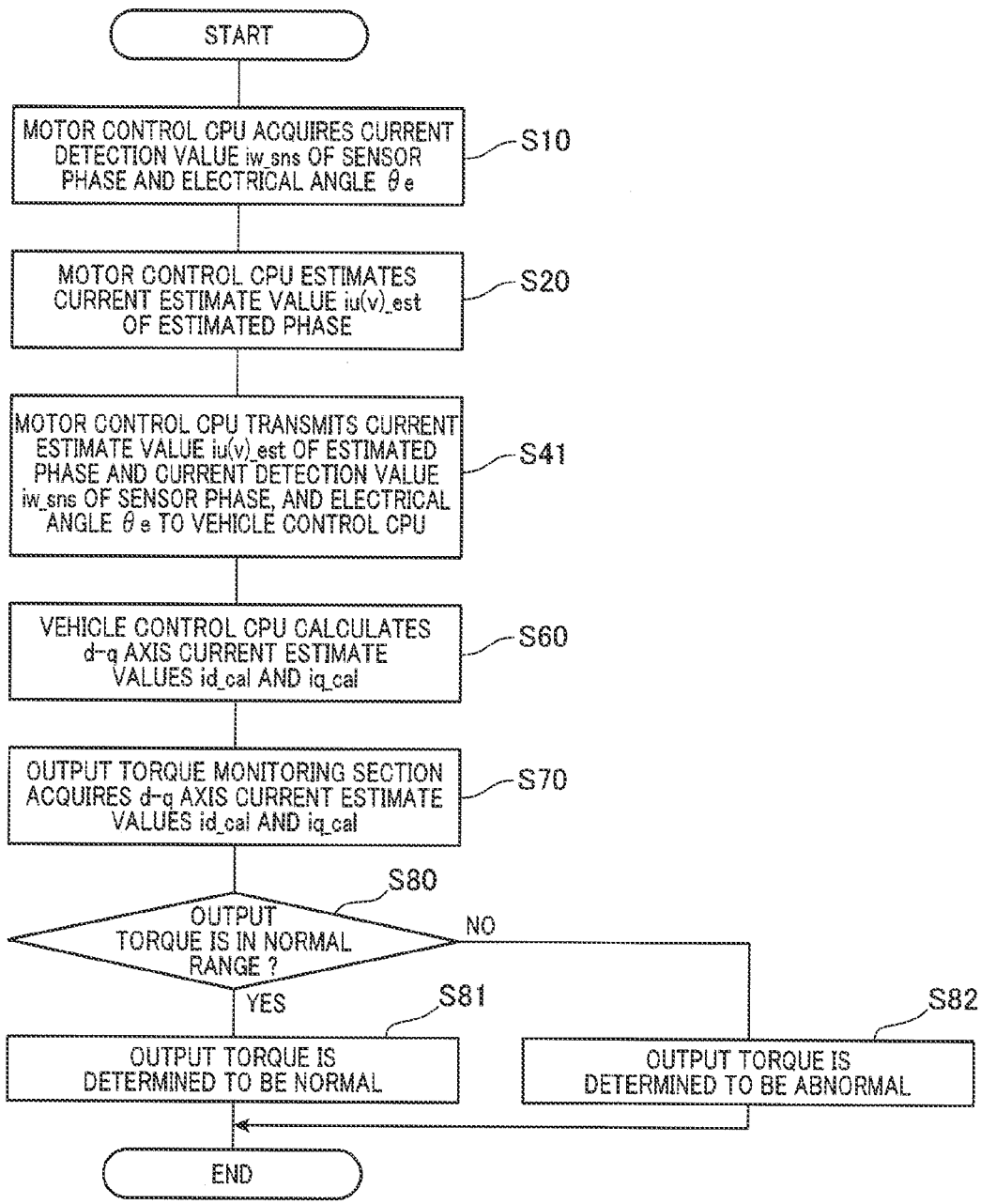
FIG. 6 is a flow diagram illustrating an output torque monitoring routine, according to the first embodiment.

Referring to FIGS. 5 and 6, hereinafter is described a configuration of a motor control apparatus 101 of the first embodiment. FIG. 5 is a block diagram illustrating a configuration of the motor control apparatus 101 of the first embodiment. FIG. 6 is a flow diagram illustrating an output torque monitoring routine for the configuration.

As shown in FIG. 5, in the motor control apparatus 101 of the first embodiment, a motor control CPU 201 transmits the "information on a control state" to a vehicle control CPU 401. The information includes the current estimate value iu(v)_est of the estimated phase, the current detection value iw_sns of the sensor phase and the electrical angle θe.

Specifically, the different-phase current estimation section 31 of the current estimation section 301 in the motor control CPU 201 calculates the current estimate value iu(v)_est of the estimated phase. The calculated current estimate value iu(v)_est is then outputted to the d-q conversion section 34, while being transmitted to the vehicle control CPU 40.

The vehicle control CPU 401 is separately provided with a d-q conversion section 43. The information transmitted from the motor control CPU 201 is subjected to d-q conversion in the d-q conversion section 43 to calculate d- and q-axis current estimate values (d-q axis current estimate values) id_cal and iq_cal. The suffixes "est" and "cal" of the d-q axis currents indicate estimate values which are identical in the technical concept.

However, due to the difference such as in the processing capability between the microcomputer of the vehicle control CPU 401 and that of the motor control CPU 201, the results of the calculations based on the same information do not necessarily coincide with each other. For this reason, the suffix "est" represents the d-q axis current estimate values resulting from the d-q conversion of the d-q conversion section 34 of the motor control CPU 201 and fed back to the subtraction section 22, while the suffix "cal" represents the d-q axis current estimate values resulting from the d-q conversion of the d-q conversion section 34 of the vehicle control CPU 401.

The d-q axis current estimate values id_cal and iq_cal calculated by the d-q conversion section 43 of the vehicle control CPU 401 are outputted to the output torque monitoring section 44. The output torque monitoring section 44 monitors the output torque on the basis of the acquired d-q axis current estimate values id_cal and iq_cal.

In monitoring the output torque, it is determined whether or not the output torque of the AC motor 2 is within a normal range, relative to the torque command value trq* derived from the torque command calculation section 41. Thus, whether the control calculation of the motor control CPU 201 is being performed normally is monitored on the basis of the determination, as mentioned above, on the output torque. Detailed configuration of the output torque monitoring section 44 will be discussed later.

Referring to FIG. 6, the output torque monitoring routine performed by the motor control apparatus 101 of the first embodiment is described. Description on the present embodiment is provided by way of an example in which the W phase is selected as the sensor phase and the U or V phase is selected as the estimated phase. Therefore, the description referring to the flow diagram is also provided on the premise of the configuration of the example.

The output torque monitoring routine is repeatedly performed at a predetermined calculation cycle while the vehicle control CPU 401 and the motor control CPU 201 are powered on. Upon starting the present routine, the motor control CPU 201 acquires, in an initial step S10, the current detection value iw_sns of the sensor phase and the electrical angle θe. In step S20, the motor control CPU 201 estimates the current estimate value iu(v)_est of the estimated phase through the estimation calculation method, for example, used in the α-β coordinate system mentioned above.

In step S41, the motor control CPU 201 transmits the current estimate value iu(v)_est of the estimated phase, the current detection value iw_sns of the sensor phase and the electrical angle θe to the vehicle control CPU 401.

In step S60, the vehicle control CPU 401 calculates the d-q axis current estimate values id_cal and iq_cal. In step S70, the output torque monitoring section 44 acquires the d-q axis current estimate values id_cal and iq_cal In step S80, the output torque monitoring section 44 determines whether or not the output torque is within a normal range. The specific criteria will be discussed later referring to FIGS. 7A to 10B. When the output torque is within the normal range (YES in step S80), the output torque monitoring section 44 determines that the output torque is normal (step S81). When the output torque is out of the normal range (NO in step S80), the output torque monitoring section 44 determines that the output torque is abnormal (step S82).

Then, the output torque monitoring routine is halted until the next iteration.

The results of the output torque monitoring are transmitted in the form of the determination signal Sj from the output torque monitoring section 44 to the torque command calculation section 41. When the output torque is determined to be abnormal, it is preferable, from a viewpoint of fail-safe, that the vehicle is safely stopped. To this end, for example, the torque command calculation section 41 sets the torque command value trq* to zero, or gives a command to the motor control CPU 201 to shut down the inverter 12. Alternatively, an indicator may be lit to inform the vehicle driver of the abnormal state.

Referring to FIGS. 7A to 10B, the output torque monitoring section 44 is specifically described, including the detailed configuration and four patterns of the criteria for determining the normal ranges in the configuration. These four patterns are combinations of whether the estimate values to be determined are based on the d-q axis current or the torque, and whether the normal range to be set is determined based on commands or a map.

In FIGS. 7A to 10B, the d-q axis current estimate values id_cal and iq_cal estimated by the vehicle control CPU 40 and the d-q axis current estimate values id_est and iq_est estimated by the motor control CPU 20 are comprehensively expressed as d-q axis current estimate values id_est and iq_est.

FIGS. 7A, 8A, 9A and 10A are block diagrams illustrating output torque monitoring sections of first to fourth patterns, respectively. FIGS. 7B, 8B, 9B and 10B are time diagrams illustrating criteria of normal ranges in the first to fourth patterns, respectively.

Figure 7A:
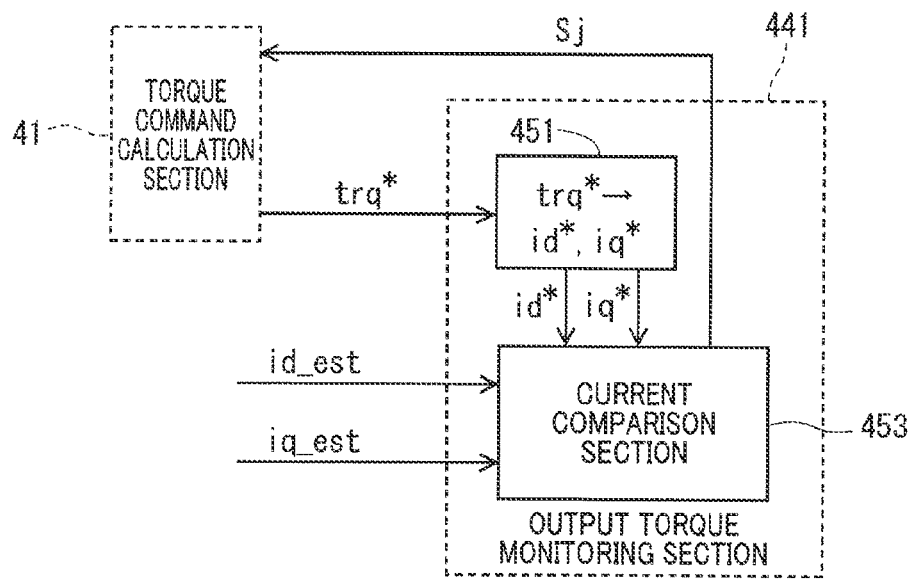
FIG. 7A is a block diagram illustrating an output torque monitoring section of a first pattern.

In the first pattern shown in FIG. 7A, an output torque monitoring section 441 permits a current command value conversion section 451 to convert the torque command value trq* derived from the torque command calculation section 41 to the d-q axis current command values id* and iq* using a formula, a map or the like. A current comparison section 453 acquires the d-q axis current estimate values id_est and iq_est, while receiving the d-q axis current command values id* and iq* resulting from the conversion in the current command value conversion section 451.

Figure 7B:
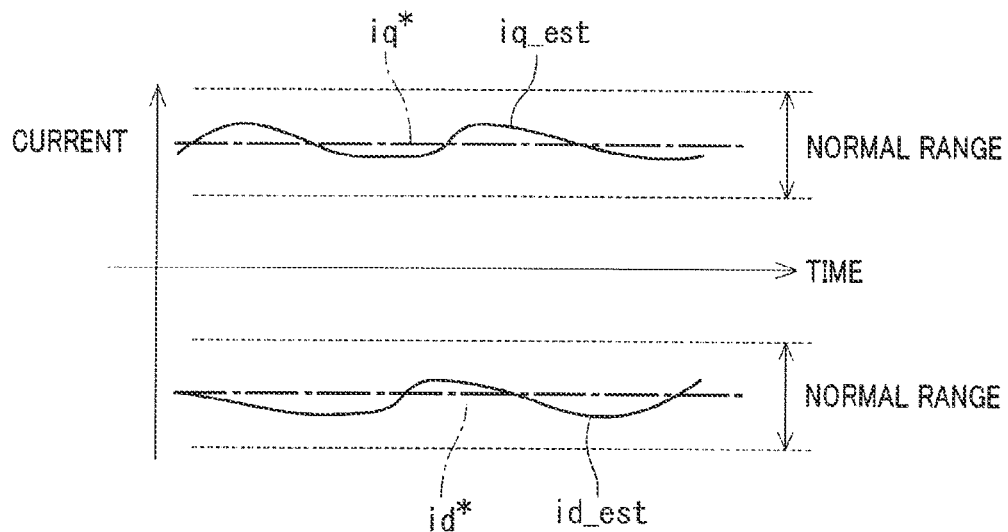
FIG. 7B is a time diagram illustrating criteria of normal ranges.

As shown in FIG. 7B, for the d- and q-axis currents, the current comparison section 453 sets predetermined ranges, such as "d-q axis current command value(s)±x [A]" as normal ranges that are based on the d-q axis current command values id* and iq*. Then, the current comparison section 453 compares the acquired d-q axis current estimate values id_est and iq_est with the normal ranges. If the current estimate values are within the normal ranges, they are determined to be normal. If the current estimate values are out of the normal ranges, they are determined to be abnormal. Then, the determination signal Sj is transmitted to the torque command calculation section 41.

Figure 8A:
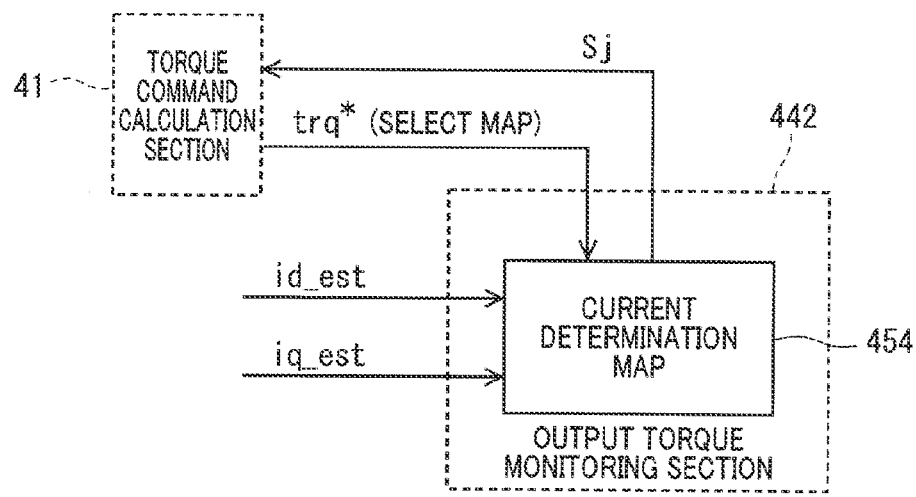
FIG. 8A is a block diagram illustrating an output torque monitoring section of a second pattern.

In the second pattern shown in FIG. 8A, an output torque monitoring section 442 uses a current determination map 454 that has been selected based on the torque command value trq* derived from the torque command calculation section 41 to thereby set normal ranges for the d- and q-axis currents.

Figure 8B:
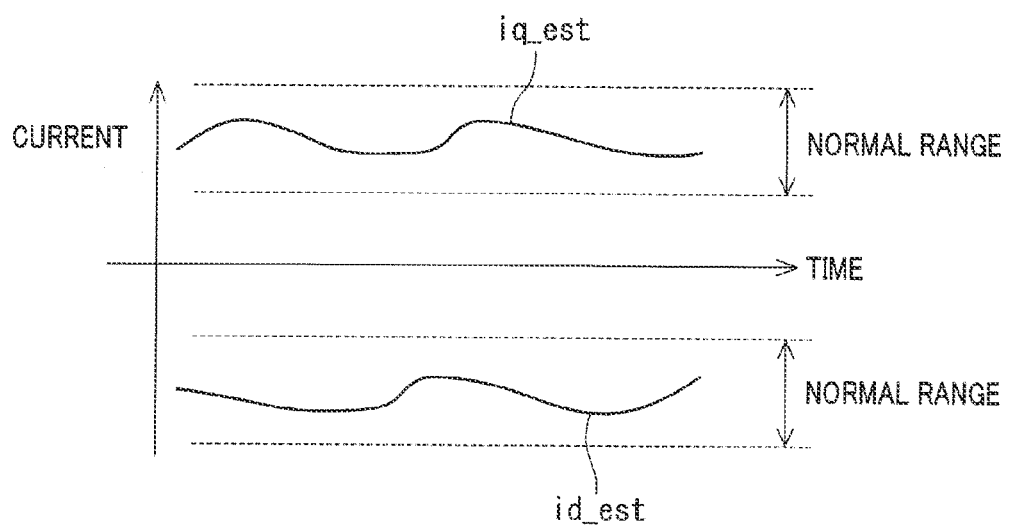
FIG. 8B is a time diagram illustrating criteria of normal ranges.

As shown in FIG. 8B, if the acquired d-q axis current estimate values id_est and iq_est are within the normal ranges, they are determined to be normal. If the current estimate values are out of the normal ranges, they are determined to be abnormal. Then, the determination signal Sj is transmitted to the torque command calculation section 41.

Figure 9A:
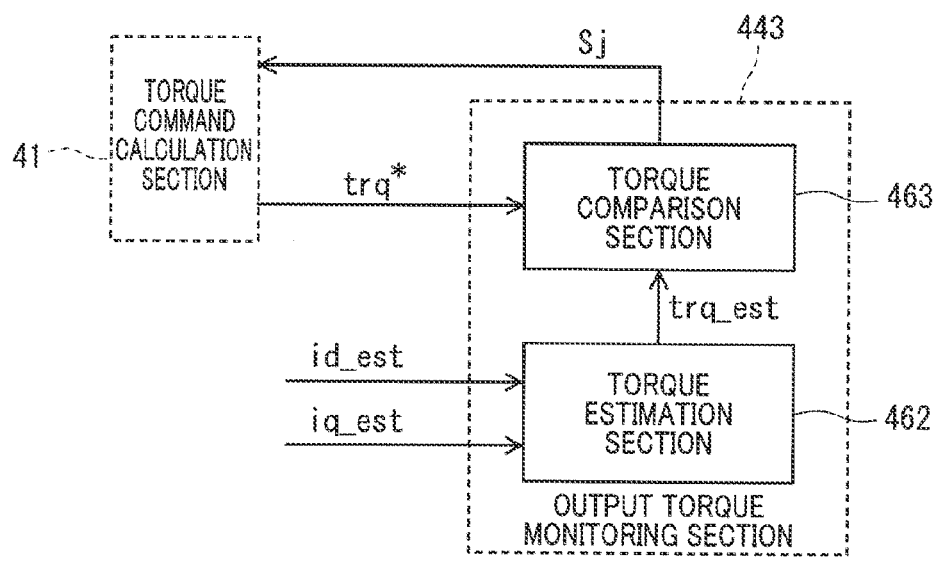
FIG. 9A is a block diagram illustrating an output torque monitoring section of a third pattern.

In the third pattern shown in FIG. 9A, an output torque monitoring section 443 permits a torque estimation section 462 to calculate a torque estimate value trq_est on the basis of the acquired d-q axis current estimate values id_est and iq_est through Formula (7), a map or the like.

$$\mathrm{trq\_est}=p \times \{\mathrm{iq\_est} \times \phi + (Ld-Lq) \times \mathrm{id\_est} \times \mathrm{iq\_est}\} \quad (7)$$

where p is a pole logarithm of the AC motor, Ld and Lq are d-axis self inductance and q-axis self inductance, respectively, and ψ is an armature flux linkage of a permanent magnet.

When the AC motor 2 to which this pattern is applied is an SPM (surface permanent magnet) motor, Ld=Lq is satisfied and thus the second term of Formula (7) becomes zero. Therefore, Formula (7) can be rewritten to Formula (8).

$$\mathrm{trq\_est}=p \times \mathrm{iq\_est} \times \phi \quad (8)$$

Specifically, in the case of an SPM motor, the torque estimate value trq_est relies on only the q-axis current estimate value iq_est.

On the other hand, when the AC motor 2 to which this pattern is applied is an IPM (interior permanent magnet) motor, Ld≠Lq is satisfied and thus the second term of Formula (7) becomes a non-zero value. In other words, the torque estimate value trq_est relies on both of the d- and q-axis current estimate values id_est and iq_est.

Figure 9B:
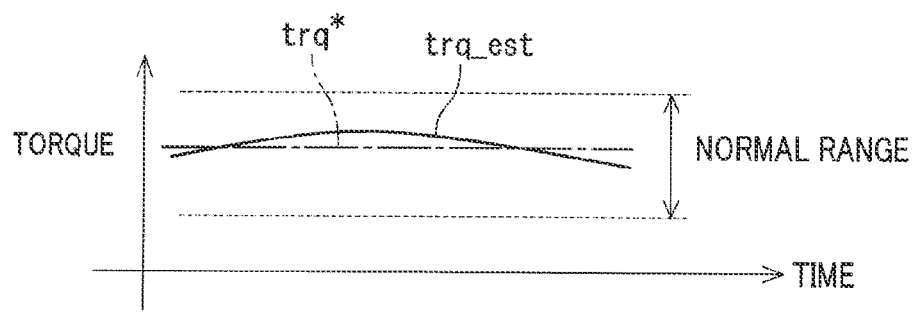
FIG. 9B is a time diagram illustrating a criterion of a normal range.

As shown in FIG. 9B, for the torque command value trq* derived from the torque command calculation section 41, the torque comparison section 463 sets a predetermined range, such as "torque command value±x[Nm]", as a normal range that is based on the torque command value trq*. Then, the torque comparison section 463 compares the torque estimate value trq_est estimated by the torque estimation section 462 with the normal range. Being within the normal range, the torque estimate value trq_est is determined to be normal. Being out of the normal range, the torque estimate value trq_est is determined to be abnormal. Then, the determination signal Sj is transmitted to the torque command calculation section 41.

Figure 10A:
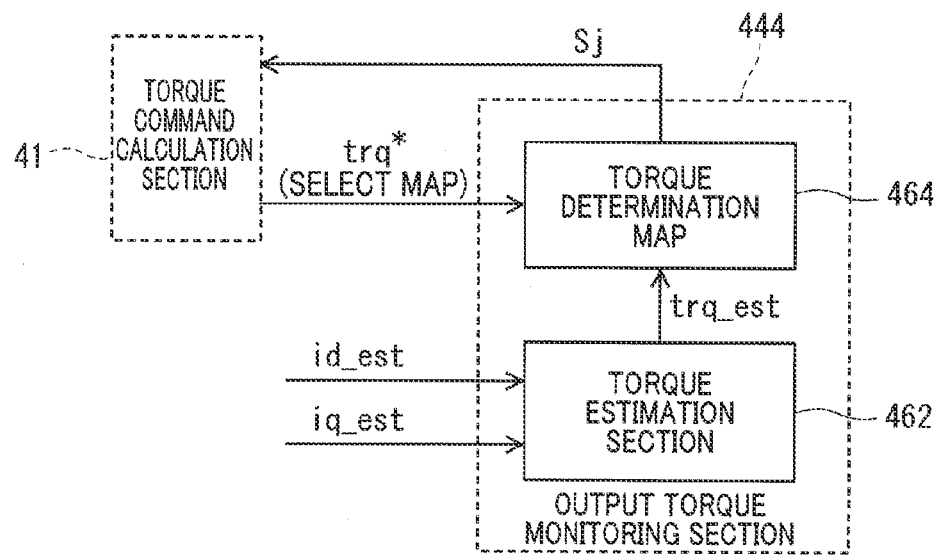
FIG. 10A is a block diagram illustrating an output torque monitoring section of a fourth pattern.

In the fourth pattern shown in FIG. 10A, similar to the third pattern shown in FIG. 9A, an output torque monitoring section 444 permits a torque estimation section 462 to estimate a torque estimate value trq_est on the basis of the acquired d-q axis current estimate values id_est and iq_est. Further, the output torque monitoring section 444 sets a normal range of torque using a torque determination map 464 that has been selected on the basis of the torque command value trq* derived from the torque command calculation section 41.

Figure 10B:
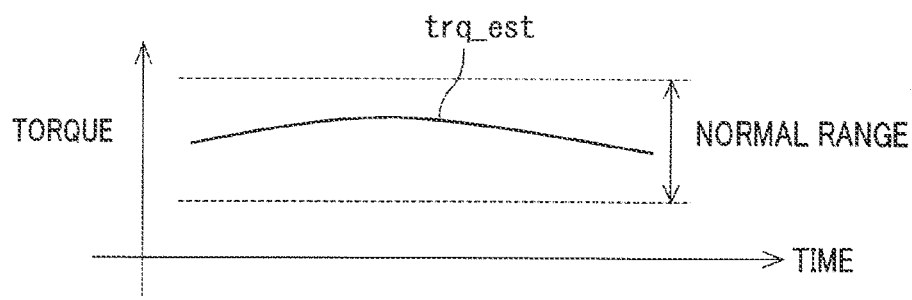
FIG. 10B is a time diagram illustrating a criterion of a normal range.

As shown in FIG. 10B, being within the normal range, the torque estimate value trq_est estimated by the torque estimation section 462 is determined to be normal. Being out of the normal range, the torque estimate value trq_est is determined to be abnormal. Then, the determination signal Sj is transmitted to the torque command calculation section 41.

The d-q axis current command values id* and iq*, the torque command value trq* or the threshold used for setting respective normal ranges in the patterns set forth above are values which are in synchronization with respective estimated calculation values to be compared with. For example, an estimated calculation value may be obtained as a result of controlling the AC motor 2 on the basis of the previous-time torque command value trq* and the obtained value may be used as a basis of determination. In such a case, the command value or the threshold used for setting a normal range is a previous-time value, or a past value that takes account of communication delay or response delay of control.

The target of determination to be compared with the normal range in the third and fourth patterns is the torque estimate value trq_est. However, the physical quantities inputted to the output torque monitoring section 44 are nonetheless the d-q axis current estimate values id_est and iq_est. The torque estimate value trq_est is not transmitted from the motor control CPU 201. In other words, the fact remains that the "information used for monitoring output torque" is the d-q axis current estimate values in this case as well.

As described above, the output torque monitoring section 44 of the vehicle control CPU 401 may select any one of the four patterns to determine whether the actual output torque of the AC motor 2 is normal or not. In vehicle control CPUs 402 and 403 as well discussed later in the second and third embodiments, any of the patterns may be selected as a configuration of the output torque monitoring section 44.

Advantageous Effects of First Embodiment (1) The motor control apparatus 101 of the present embodiment controls the driving of the AC motor 2 by having the current sensor 13 detect the current passing through one phase as a sensor phase among the three phases. In the apparatus, the motor control CPU 201 serving as a lower control unit cooperates with the vehicle control CPU 401 serving as an upper control unit to calculate the d-q axis current estimate values id_cal and iq_cal as the "information used for monitoring output torque".

Specifically, the motor control CPU 201 estimates the current estimate value iu(v)_est of the estimated phase through an estimation calculation based on the current detection value iw_sns of the sensor phase and the electrical angle θe. Then, the current estimate value iu(v)_est, the current detection value iw_sns of the sensor phase, and the electrical angle θe, as the "information related to a control state", are transmitted to the vehicle control CPU 401. Based on the received information, the vehicle control CPU 401 calculates the d-q axis current estimate values id_cal and iq_cal.

According to this configuration, the vehicle control CPU 401 serving as an upper control unit is able to properly monitor the output torque of the AC motor 2 on the basis of the information acquired from the motor control CPU 201 serving as a lower control unit.

(2) In the present embodiment, the output torque monitoring section 44 determines an abnormality of the output torque on the basis of the d-q axis current estimate values id_est and iq_est, or the torque estimate value trq_est calculated from the d-q axis current estimate values id_est and iq_est. Accordingly, the apparatus of the present embodiment, including the case where the apparatus is applied to an IPM motor, is not only able to determine the direction of the output torque by comparing the q-axis current alone with the upper and lower limits as in the conventional art disclosed in Patent document JP-A-2000-023499, but also able to correctly evaluate the value of the output torque for the determination of an abnormality.

(3) In the present embodiment, the d-q axis current estimate values id_est and iq_est are used as the "information used for monitoring output torque". The output torque is monitored on the basis of the information which is used for current feedback control by the motor control CPU 201. Thus, an abnormality in the calculation performed by the motor control CPU 201 can be properly and easily found out.

(4) According to the conventional art disclosed in Patent documents JP-A-2008-086139 and JP-A-2004-159391, current command values are used as they are to calculate estimate values in one-phase control based on a current detection value of one phase serving as a sensor phase. In other words, in the conventional art disclosed in these documents, the "commands are used instead of detection values" to compensate insufficient information. It is not that the estimate values are estimated "basically on the basis of detection values".

In an AC motor, a current vector follows a command current vector corresponding to current command values, while being varied due to a control error or the influence such as of feedback control. Therefore, there is a deviation between the actual current phase and a command current phase. Further, since the variation in the command values, if it occurs, is very small, it is difficult to correctly figure out the actual state of a real machine from the estimate values obtained based on the command values. Therefore, the output torque cannot be properly monitored using the estimate values obtained based on such current command values.

In this regard, the current estimation section 301 of the motor control CPU 201 of the present embodiment performs estimation calculation without using the d-q axis current command values id* and iq*. The current estimation section 301 uses the current detection value iw_sns of the sensor phase and the electrical angle θe as bases for the estimation of the current estimate value iu(v)_est of the estimated phase. Specifically, the current estimation section 301 does not use command values instead of detection values, but uses estimate values based on detection values, and the detection values. Accordingly, the output torque is monitored "basically on the basis of detection values". Thus, the actual state of a real machine can be correctly figured out to thereby properly monitor the output torque.

Second Embodiment

Figure 12:
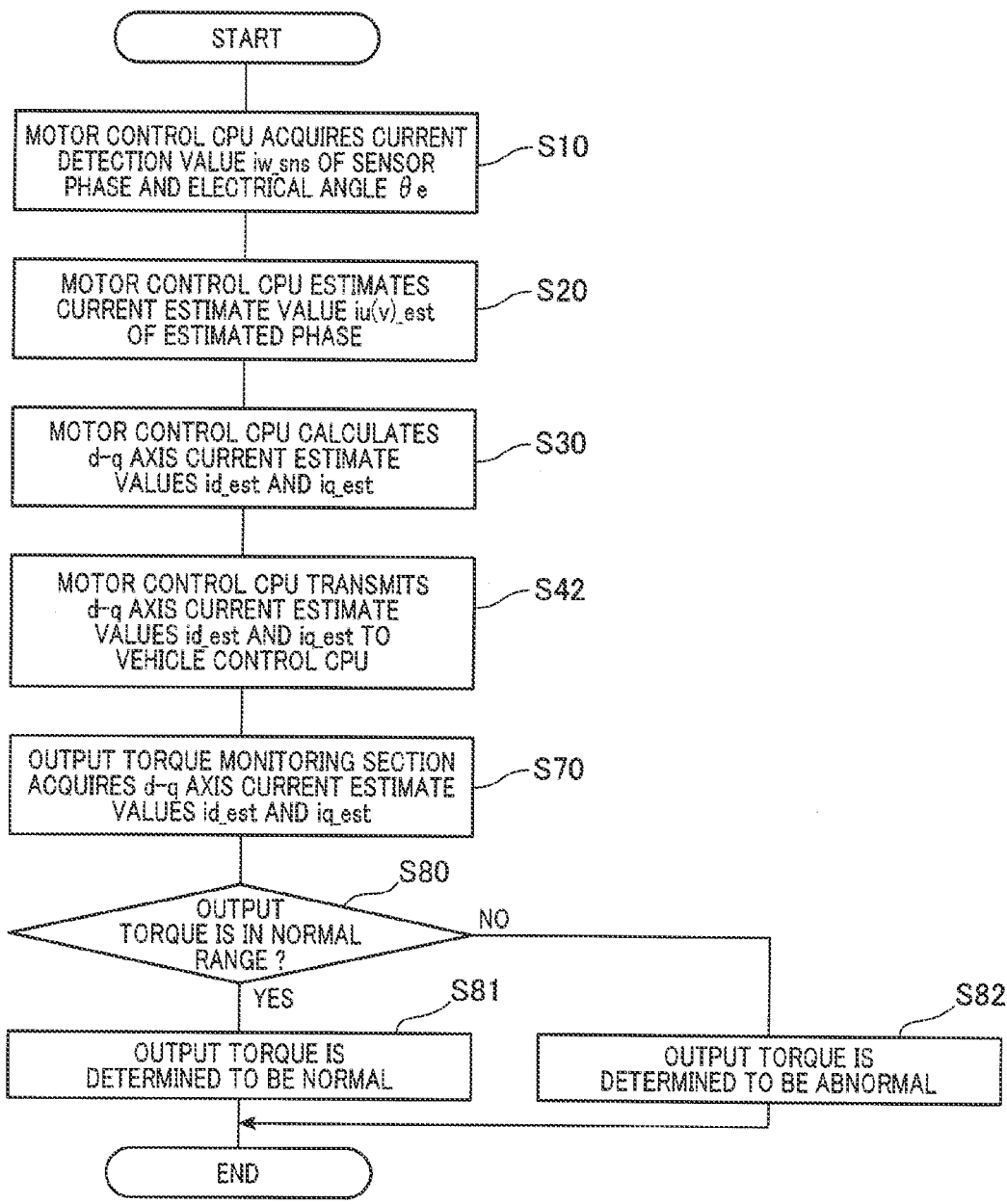
FIG. 12 is a flow diagram of an output torque monitoring routine, according to the second embodiment.

Referring now to FIGS. 11 and 12, the second embodiment is described.

In the second and the subsequent third embodiments, the components and processing steps identical with or similar to those in the first embodiment are given the same reference numbers for the sake of omitting unnecessary explanation.

FIG. 11 is a block diagram of a motor control apparatus 102 according to the second embodiment. FIG. 12 is a flow diagram illustrating an output torque monitoring routine according to the second embodiment.

As shown in FIG. 11, in the motor control apparatus 102 of the second embodiment, the d-q axis current estimate values id_est and iq_est, as the "information related to a control state", are transmitted from a motor control CPU 202 to a vehicle control CPU 402.

Specifically, the d-q axis current estimate values id_est and iq_est are calculated by the d-q conversion section 34 of the current estimation section 301 in the motor control CPU 202. The calculated d-q axis current estimate values id_est and iq_est are fed back to the subtracter 22, while being transmitted to the vehicle control CPU 402.

The vehicle control CPU 402 does not include the d-q conversion section 43 as the vehicle control CPU 401 of the first embodiment does. Thus, the d-q axis current estimate values id_est and iq_est calculated in the motor control CPU 202 are directly transmitted to the output torque monitoring section 44. The output torque monitoring section 44 monitors the output torque on the basis of the received d-q axis current estimate values id_est and iq_est.

In the flow diagram shown in FIG. 12, steps S41 and 60 of the flow diagram shown in FIG. 6 of the first embodiment are replaced by steps S30 and 42.

In step S30, the motor control CPU 202 calculates the d-q axis current estimate values id_est and iq_est. In step S42, the d-q axis current estimate values id_est and iq_est are transmitted from the motor control CPU 202 to the vehicle control CPU 402.

In step S70, the output torque monitoring section 44 of the second embodiment acquires the d-q axis current estimate values id_est and iq_est from the vehicle control CPU 402. This step is provided as substantially the same as step S70 of the first embodiment, at which the output torque monitoring section 44 internally acquires the d-q axis current estimate values id_cal and iq_cal in the vehicle control CPU 401.

In the second embodiment, the d-q axis current estimate values id_est and iq_est calculated by the motor control CPU 202 are transmitted to the vehicle control CPU 402 to maximally make use of the results of the calculation of the motor control CPU 202. Accordingly, the advantageous effects similar to those of the first embodiment can be provided. In addition, the total calculation load of the motor control CPU 202 and the vehicle control CPU 402 can be reduced.

Third Embodiment

Figure 14:
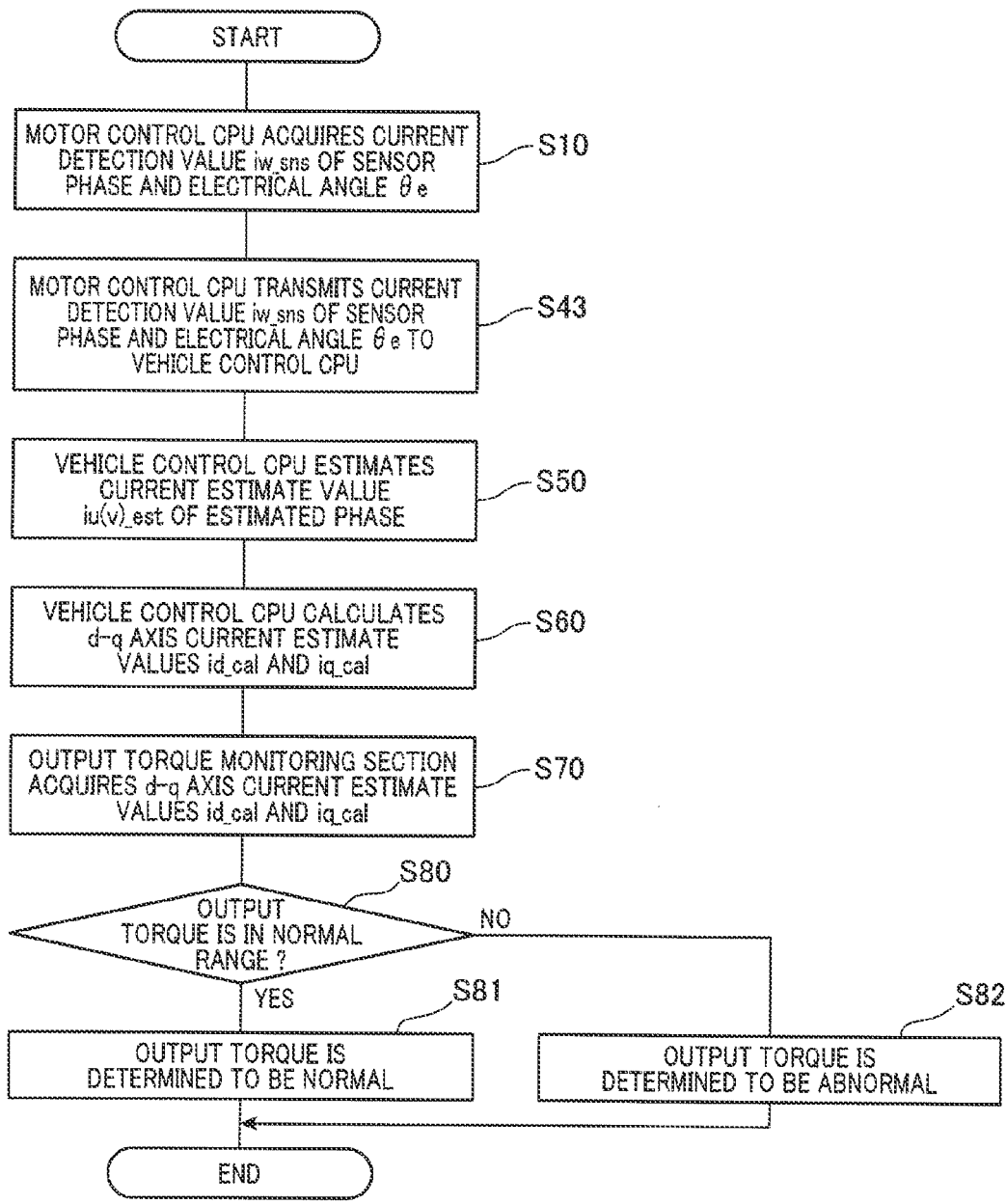
FIG. 14 is a flow diagram of an output torque monitoring routine, according to the third embodiment.

Referring to FIGS. 13 and 14, the third embodiment is described. FIG. 13 is a block diagram of a motor control apparatus 103 according to the third embodiment. FIG. 14 is a flow diagram of an output torque monitoring routine according to the third embodiment.

As shown in FIG. 13, in the motor control apparatus 103 of the third embodiment, the current detection value iw_sns of the sensor phase and the electrical angle θe, as the "information related to a control state", are transmitted from a motor control CPU 203 to a vehicle control CPU 403.

Specifically, the motor control CPU 203 acquires information on the current detection value iw_sns of the sensor phase from the current sensor 13 and information on the electrical angle θe from the rotation angle sensor 14. The acquired information is internally used in the motor control CPU 203 for feedback control calculation. In parallel with this, the same information is transmitted as it is to the vehicle control CPU 403. In this case, it is desirable that high-speed communication and high-speed sampling are available between the motor control CPU 203 and the vehicle control CPU 403.

The vehicle control CPU 403 includes a different-phase current estimation section 42 and the d-q conversion section 43. The different-phase current estimation section 42 estimates the current estimate value iu(v)_est of the estimated phase on the basis of the current detection value iw_sns of the sensor phase and the electrical angle θe.

Similar to the first embodiment, the d-q conversion section 43 carries out d-q conversion for the current detection value iw_sns of the sensor phase and the current estimate value iu(v)_est of the estimated phase, and calculates the d-q axis current estimate values id_cal and iq_cal, followed by outputting the calculated values to the output torque monitoring section 44. The output torque monitoring section 44 monitors the output torque on the basis of the d-q axis current estimate values id_cal and iq_cal acquired from the d-q conversion section 43.

In the flow diagram shown in FIG. 14, steps S20 and S41 of the flow diagram of the first embodiment shown in FIG. 6 are replaced by steps S43 and S50.

In step S43, the motor control CPU 203 transmits the current detection value iw_sns of the sensor phase and the electrical angle θe to the vehicle control CPU 403. In step S50, the vehicle control CPU 403 estimates the current estimate value iu(v)_est of the estimated phase.

In the third embodiment, the vehicle control CPU 403 does not make use of the results of the calculation conducted by the motor control CPU 203, but calculates the d-q axis current estimate values id_cal and iq_cal by itself on the basis of the received information on the current detection value iw_sns of the sensor phase and the electrical angle θe. Accordingly, the advantageous effects similar to those of the first embodiment can be provided. In addition, since there is no probability of being influenced by the abnormality in the calculation of the motor control CPU 203, reliability of monitoring the output torque is improved.

Fourth Embodiment

The current estimation section 301 (see FIG. 3) of the motor control CPU 201, 202 or 203 of the first, second or third embodiment permits the different-phase current estimation section 31 to estimate the current estimate value iu_est of the estimated phase without using the d-q axis current command values id* and iq*, or the three-phase current command values iu*, iv* and iw* obtained by subjecting the d-q axis current command values id* and iq* to reverse d-q conversion.

Figure 15:
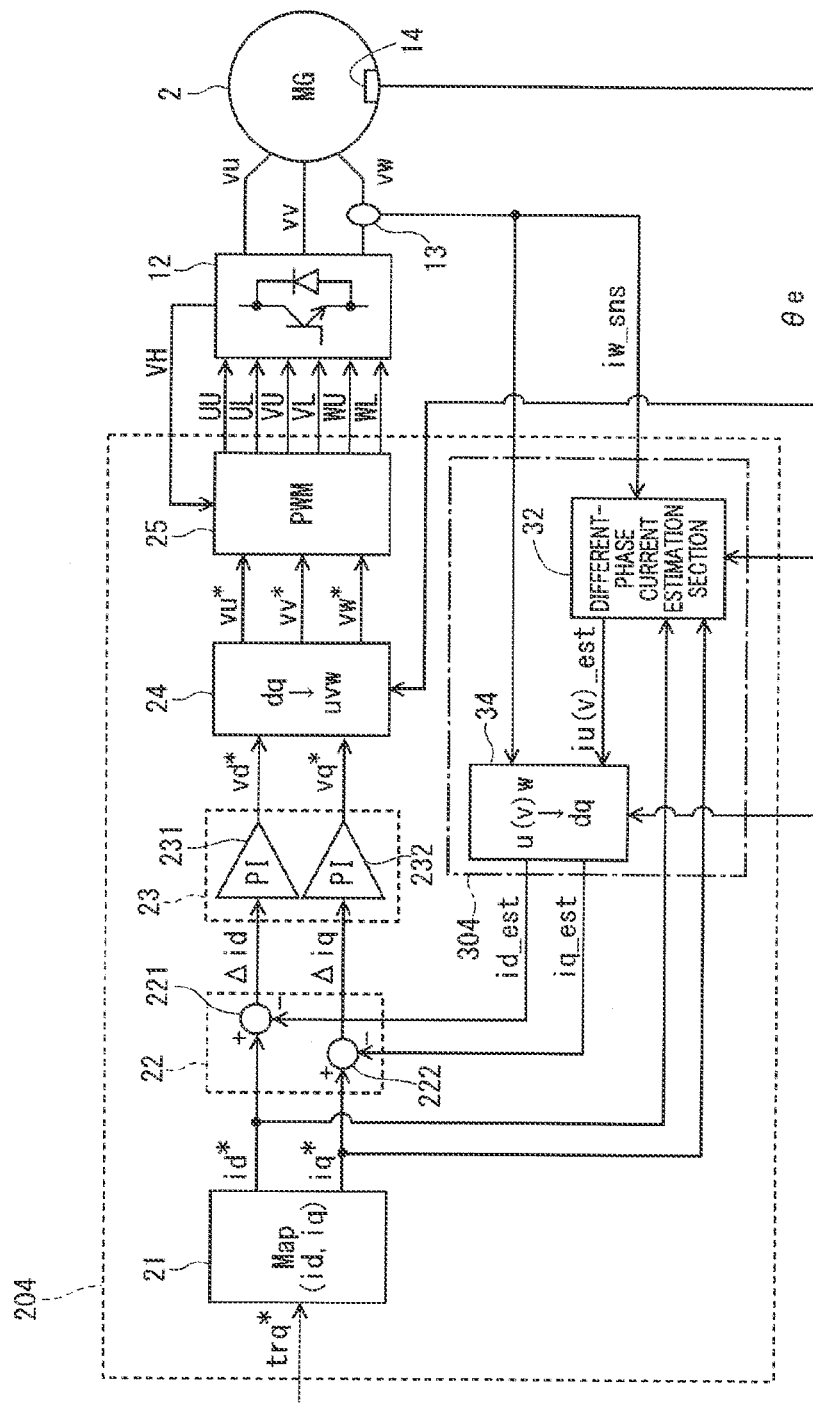
FIG. 15 is a block diagram illustrating a motor control CPU, according to a fourth embodiment.

FIG. 15 is a block diagram illustrating a motor control CPU 204 according to a fourth embodiment. As shown in FIG. 15, in contrast to the first, second or third embodiment, the motor control CPU 204 includes a current estimation section 304 which includes a different-phase current estimation section 32. The different-phase current estimation section 32 estimates the current estimate value iu_est of the estimated phase using the d-q axis current command values id* and iq*, on the basis of the current detection value iw_sns of the sensor phase and the electrical angle θe of the AC motor 2. Then, the d-q conversion section 34 carries out d-q conversion for the current detection value iw_sns of the sensor phase and the current estimate value iu_est of the estimated phase that has been "estimated using the d-q axis current command values id* and iq*" to thereby estimate the d-q axis current estimate values id_est and iq_est.

As mentioned above, the actual state of a real machine cannot be correctly figured out from the estimate values that have been calculated using the current command values as they are, as in the conventional art disclosed in Patent documents JP-A-2008-086139 and JP-A-2004-159391. Accordingly, modes of using such estimate values alone are excluded from the scope of the embodiments.

On the other hand, in a method of calculating estimate values using current command values, the current command values should not be simply used for compensating insufficient information, but should be corrected on the basis of the detection values to reflect the information of the detection values in the estimation calculation as much as possible. The estimated values obtained in this way can represent accurately the actual state of a real machine.

As an example of a preferable estimation calculation using current command values, the following description summarizes the estimation calculation method disclosed in JP-A-2013-172592 or JP-A-2013-172593.

Similar to the calculation method exemplified in the first embodiment, this method calculates the current estimate value iu_est of the U phase serving as an estimated phase from the sensor-phase reference current phase θx that has been calculated on the basis of the α-axis current iα and the β-axis current iβ in the α-β coordinate system. Compared to the method introduced in the first embodiment, the method of calculating the β-axis current iβ alone is different and the rest of the calculation process is the same.

According to this method, the β-axis current estimate value iβ_est is calculated through Formula (9) that uses the current command values iu* and iv* of two phases other than the sensor phase, or Formula (10) that uses the current command value iv* of one phase other than the sensor phase and the current detection value iw_sns of the sensor phase.

$$i\beta\_est = K \times \left(\frac{\sqrt{3}}{2} \times iu^* - \frac{\sqrt{3}}{2} iv^*\right) \quad (9)$$

$$i\beta\_est = K \times \left(-\sqrt{3} \times iv^* - \frac{\sqrt{3}}{2} iw\_sns\right) \quad (10)$$

In this calculation method, the β-axis current estimate value iβ_est is calculated using the current command values, followed by calculating the sensor-phase reference current phase θx on the basis of the α-axis current iα based on the current detection value iw_sns of the sensor phase and the calculated β-axis current estimate value iβ_est (Formula (4)). Further, the current estimate value iu_est of the estimated phase is calculated on the basis of the sensor-phase reference current phase θx and the current detection value iw_sns of the sensor phase (Formula (5)). In this way, cyclical use of the current detection value iw_sns of the sensor phase in the process of the estimation calculation can relatively reduce the ratio for the current command values to contribute to the estimate values. Thus, the resultant estimate values are the ones "basically based on detection values".

Accordingly, the fourth embodiment can provide the advantageous effects similar to those of the first, second or third embodiment.

Fifth Embodiment

Figure 16:
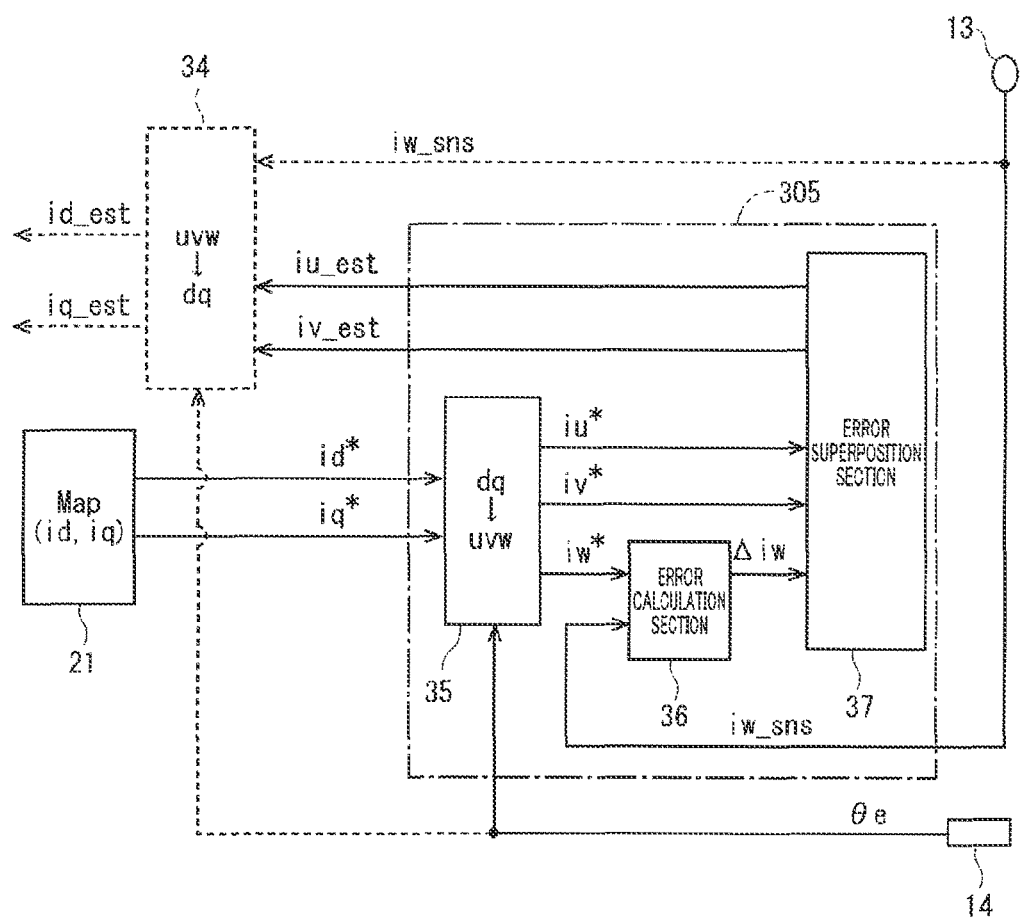
FIG. 16 is a block diagram illustrating a current estimation section, according to a fifth embodiment.

Referring to FIG. 16, a fifth embodiment is described. The fifth embodiment is another example of the current estimation section estimating the current estimate values iu_est and iv_est of the phases other than the sensor phase by using current command values.

FIG. 16 is a block diagram illustrating a current estimation section 305 according to the fifth embodiment. As shown in FIG. 16, the current estimation section 305 includes a reverse d-q conversion section 35, an error calculation section 36 and an error superposition section 37.

The reverse d-q conversion section 35 receives the d-q axis current command values id* and iq* calculated by the d-q axis current command calculation section 21, and the electrical angle θe. In the reverse d-q conversion section 35, the d-q axis current command values id* and iq* are subjected to reverse d-q conversion to calculate the three-phase current command values iu*, iv* and iw*.

The error calculation section 36 repeatedly calculates a control error Δiw at a predetermined calculation cycle. The control error Δiw is the difference between the W-phase current command value iw* and the current detection value iw_sns of the W phase serving as a sensor phase.

The error superposition section 37 superposes the phase of the control error Δiw on the U- and V-phase current command values iu* and iv* such as by shifting the phase by ±120° and estimates the U- and V-phase current estimate values iu_est and iv_est.

Thus, the information on the control error Δiw based on the current detection value iw_sns of the sensor phase serving as the "variable component" is permitted to be included in the current command values. As a result, the obtained current estimate values iu_est and iv_est can reflect the actual state of a real machine.

The U- and V-phase current estimate values iu_est and iv_est outputted from the error superposition section 37 may further be converted to the d-q axis current estimate values id_est and iq_est by the d-q conversion section 34 together with the current detection value iw_sns of the sensor phase.

Other Embodiments (A) As shown in FIG. 2, in the foregoing embodiments, the vehicle control CPU 40 having the torque command calculation section 41 and the output torque monitoring section 44 configures the "monitoring system of an upper control unit".

Figure 17A:
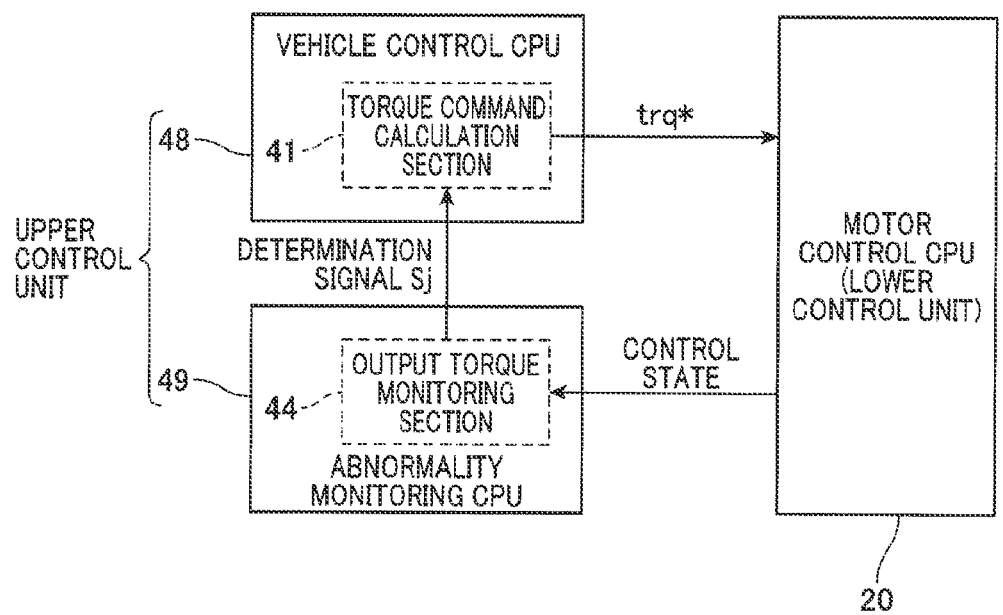
FIGS. 17A and 17B are block diagrams illustrating monitoring systems, according to other embodiments.
Figure 17B:
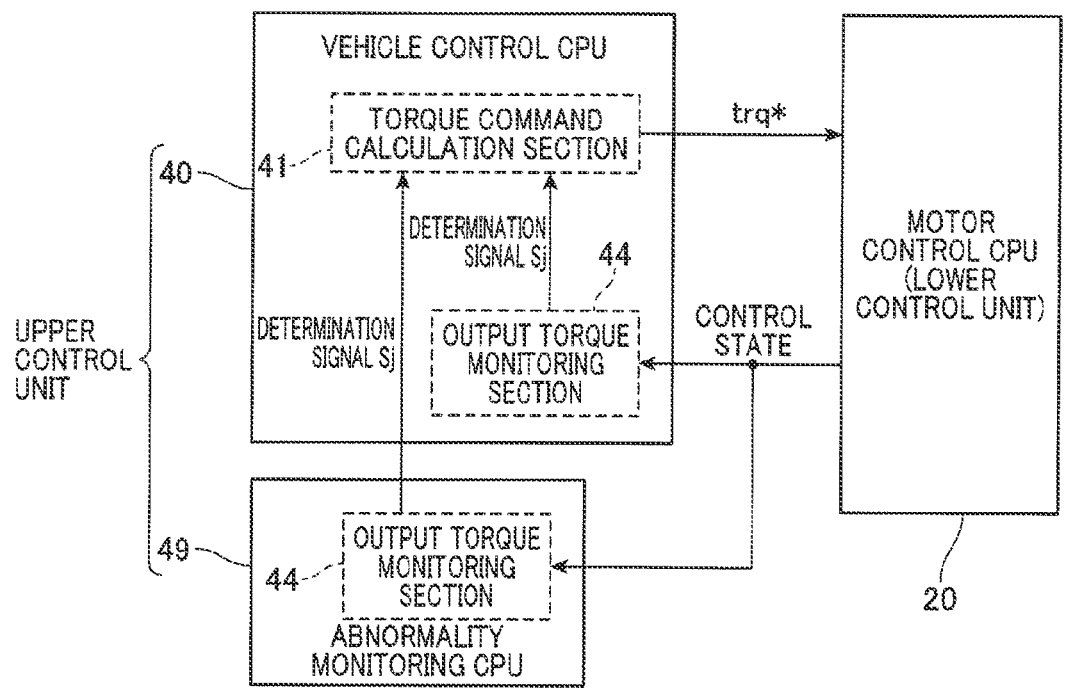

FIGS. 17A and 17B each are block diagram of the "monitoring system of an upper control unit". As shown in FIG. 17A, a vehicle control CPU 48 having the torque command calculation section 41 may be separated from an abnormality monitoring CPU 49 having the output torque monitoring section 44, so that the monitoring system is mainly configured by the abnormality monitoring CPU 49. In this example, the determination results derived from the abnormality monitoring CPU 49 are transmitted, in the form of the determination signal Sj, to the vehicle control CPU 48.

Alternatively, as shown in FIG. 17B, still another abnormality monitoring CPU 49 may be provided to the upper control unit, in addition to the vehicle control CPU 40 having the torque command calculation section 41 and the output torque monitoring section 44 to configure a double monitoring system.

(B) In FIG. 2 comprehensively showing the foregoing embodiments, the inverter 12 that is a controlled object of the motor control CPU 20 and the current sensor 13 that is an information source for the motor control CPU 20 are illustrated as entities that are out of the range of the motor control apparatus 10 indicated by the dash-dot-dot line. However, this is merely a distinction under a concept and should not be construed as implying a physical configuration. For example, the motor control CPU 20, the inverter 12 and the current sensor 13 may be physically mounted on a single substrate.

Alternatively, the vehicle control CPU 40 and the motor control CPU 20 may be independently mounted on the respective substrates, or may be mounted sharing a single substrate. The same applies to a mode, as in (A) set forth above, in which the upper control unit is configured by a plurality of CPUs.

(C) The first, second or third embodiment uses a calculation method as an estimation calculation without using current command values. In the calculation method, the β-axis current iβ is calculated in the α-β coordinate system, on the basis of the derivative value Δia of the α-axis current. In an estimation calculation other than this, an asymptotic estimation calculation, for example, may be repeatedly performed at a predetermined calculation cycle. In the asymptotic estimation calculation, a correction vector that has been calculated based on an estimation error Δiw is integrated on a d-q axis plane to estimate the d-q axis current estimate values. The estimation error Δiw is the difference between a sensor-phase current reference value iw_bf that is an axial component of the sensor phase based on the d-q axis current estimate values id_est and iq_est obtained through the previous-time calculation, and current-time current detection value iw_sns of the sensor phase. The estimation method should not be construed as being limited to the above estimation method, but any estimation method may be used as far as the method is based on only the detection values.

(D) The estimation method that uses the current command values and are based on the command values and the detection values should not also be construed as being limited to the estimation method of the fourth and the fifth embodiment, but any method may be used.

(E) The AC motor that is a controlled object of the control apparatus is provided on the premise of being controlled on the basis of the current detection value of one phase serving as a sensor phase. However, this does not necessarily mean that the current sensor 13 is provided to one phase alone. For example, a current sensor for use, such as for monitoring, other than control may be separately provided. Alternatively, control may be routinely performed on the basis of the detection values of the current sensors provided to two phases, and the configuration of the embodiment may be applied to this case in the event that a current sensor of one of the two phases has a fault and control has shifted to one-phase control based on the normal phase.

The sensor phase in which the phase current iα detected by a current sensor is not limited to the W phase as in the foregoing embodiments, but may be the U- or V phase. Depending on the sensor phase, an estimated phase other than the sensor phase may be changed.

(F) The control method to which the control apparatus is applied is not limited to the sine wave control mode or the overmodulation control mode described in the foregoing embodiment, but any control method, such as a rectangular wave control mode in which one pulse is applied to one current cycle, may be used.

(G) The AC motor used in the foregoing embodiments is a permanent magnet synchronous three-phase AC motor. However, in another embodiment, the AC motor may be an induction motor or a different synchronous motor. The AC motor used in the foregoing embodiments is a so-called motor-generator having functions both of a motor and a generator. However, in another embodiment, the AC motor does not necessarily have to have the function of a generator.

In addition, the AC motor is not limited a three-phase AC motor but may be a polyphase (multiphase) AC motor such as a five-phase AC motor.

(H) The application of the control apparatus for the AC motor control apparatus is not limited to the system, as in the above embodiments, in which a set of an inverter and an AC motor is provided. The control apparatus may be applied to a system which is provided with two or more sets of an inverter and an AC motor. Alternatively, the control apparatus may be applied to a system such as of an electric train, in which a plurality of AC motors are connected to a single inverter in parallel.

(I) The application of the control apparatus for the AC motor control apparatus is not limited to the AC motor of a hybrid car having a configuration as shown in FIG. 1. The control apparatus may be applied to an AC motor of an electric car having any configuration. The control apparatus may be applied to an AC motor of vehicles other than electric vehicles.

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

As an aspect of the embodiment, a control apparatus for an AC motor is provided. The control apparatus controls driving of the AC motor by having a current sensor detect current passing through one phase serving as a sensor phase among multiple phases. The control apparatus includes an upper control unit and a lower control unit.

The upper control unit includes a torque command calculation section calculating a torque command value for the AC motor, and an output torque monitoring section monitoring output torque to determine whether or not the output torque of the AC motor is within a normal range, relative to the torque command value.

The lower control unit communicates with the upper control unit, and controls current supply to an inverter based on a torque command value received from the upper control unit to control driving of the AC motor. The lower control unit acquires information on a current-supply state and a rotation state of the AC motor and transmits information on a control state to the upper control unit.

At least one of the upper control unit and the lower control unit estimates a current estimate value of an estimated phase, which is other than the sensor phase, or a d-q axis current estimate value based on a current detection value of the one phase serving as the sensor phase and an electrical angle of the AC motor, and calculates monitoring information used for monitoring output torque based on the current estimate value. In addition, the output torque monitoring section monitors the output torque based on the monitoring information.

The AC motor includes AC drive motors, generators and motor-generators. For example, such an AC motor corresponds to a motor-generator that is used as a main engine of a hybrid car or an electric car to generate torque for driving the drive wheels. Also, for example, a vehicle control CPU corresponds to the upper control unit and a motor control CPU corresponds to the lower control unit.

It should be noted that the term d-q axis current estimate values means a d-axis current estimate value and a q-axis current estimate value.

In the present embodiment, the current estimate values are calculated on the basis of the current detection value of one phase serving as a sensor phase and the electrical angle of the AC motor. Based on the estimated current estimate values, the upper control unit or the lower control unit calculates, or these control units cooperatively calculate the information used for monitoring the output torque. Accordingly, in the control apparatus in which a current of one phase among the multiple phases is detected to control current supply to the AC motor, the upper control unit is able to properly monitor the output torque of the AC motor on the basis of the information derived from the lower control unit.

In the present document, the output torque monitoring section determines the abnormality of the output torque on the basis of the d-q axis current estimate values or the torque estimate value calculated from the d-q current estimate values. Accordingly, the apparatus of the present document, including the case where the apparatus is applied to an IPM motor, is not only able to determine the direction of the output torque by comparing the q-axis current alone with the upper and lower limits as in the conventional art disclosed in Patent document JP-A-2000-023499, but also able to correctly evaluate the value of the output torque for the determination of an abnormality.

Preferably, the "information used for monitoring output torque" of the present embodiment is the d-q axis current estimate values. When the lower control unit monitors the output torque on the basis of the information used for current feedback control, an abnormality in the calculation of the lower control unit can be properly and easily found out.

The estimate values used for monitoring the output torque are required to be able to represent the actual state of a real machine. From this standpoint, the estimation calculation in which current command values are simply subjected to conversion and the converted values are used as they are involves a difficulty in correctly determining the actual state of the real machine, and thus cannot properly monitor the output torque.

Preferably, the output torque is monitored "basically on the basis of detection values" through the "estimation calculation without using current commands". Alternatively, in the "estimation calculation using current commands", it is preferable that the current command values are not simply used for compensating insufficient information, but are corrected on the basis of the detection values to reflect the information of the detection values in the estimation calculation as much as possible. The estimate values obtained in this way can figure out the actual state of a real machine. Thus, the output torque can be properly monitored.

What is claimed is:

1. A control apparatus for an AC motor, the control apparatus controlling driving of the AC motor by having a current sensor detect current passing through one phase serving as a sensor phase among multiple phases, the apparatus comprising:

an upper control unit which includes a torque command calculation section calculating a torque command value for the AC motor, and an output torque monitoring section monitoring output torque to determine whether or not the output torque of the AC motor is within a normal range, relative to the torque command value; and a lower control unit which communicates with the upper control unit, and controls current supply to an inverter based on a torque command value received from the upper control unit to control driving of the AC motor, and which acquires information on a current-supply state and a rotation state of the AC motor and transmits information on a control state to the upper control unit, wherein:

at least one of the upper control unit and the lower control unit estimates a current estimate value of an estimated phase, which is other than the sensor phase, or a d-q axis current estimate value based on a current detection value of the one phase serving as the sensor phase and an electrical angle of the AC motor, and calculates monitoring information used for monitoring output torque based on the current estimate value, the output torque monitoring section monitors the output torque based on the monitoring information, the monitoring information used for monitoring the output torque is a d-q axis current estimate value, the lower control unit or the upper control unit estimates the d-q axis current estimate value by estimation calculation different from estimation calculation using a current command value, the lower control unit estimates the current estimate value of the estimated phase, and transmits the current estimate value of the estimated phase, the current detection value of the sensor phase, and the electrical angle of the AC motor to the upper control unit, and the upper control unit converts the current estimate value of the estimated phase and the current detection value of the sensor phase to d-q axis current estimate values to monitor the output torque.

2. A control apparatus for an AC motor, the control apparatus controlling driving of the AC motor by having a current sensor detect current passing through one phase serving as a sensor phase among multiple phases, the apparatus comprising:

an upper control unit which includes a torque command calculation section calculating a torque command value for the AC motor, and an output torque monitoring section monitoring output torque to determine whether or not the output torque of the AC motor is within a normal range, relative to the torque command value; and a lower control unit which communicates with the upper control unit, and controls current supply to an inverter based on a torque command value received from the upper control unit to control driving of the AC motor, and which acquires information on a current-supply state and a rotation state of the AC motor and transmits information on a control state to the upper control unit, wherein:

at least one of the upper control unit and the lower control unit estimates a current estimate value of an estimated phase, which is other than the sensor phase, or a d-q axis current estimate value based on a current detection value of the one phase serving as the sensor phase and an electrical angle of the AC motor, and calculates monitoring information used for monitoring output torque based on the current estimate value, the output torque monitoring section monitors the output torque based on the monitoring information, the monitoring information used for monitoring the output torque is a d-q axis current estimate value, the lower control unit or the upper control unit estimates the d-q axis current estimate value by estimation calculation different from estimation calculation using a current command value, the lower control unit estimates the d-q axis current estimate value and transmits the d-q axis current estimate value to the upper control unit, and the upper control unit monitor the output torque based on the d-q axis current estimate value.

3. A control apparatus for an AC motor, the control apparatus controlling driving of the AC motor by having a current sensor detect current passing through one phase serving as a sensor phase among multiple phases, the apparatus comprising:

an upper control unit which includes a torque command calculation section calculating a torque command value for the AC motor, and an output torque monitoring section monitoring output torque to determine whether or not the output torque of the AC motor is within a normal range, relative to the torque command value; and a lower control unit which communicates with the upper control unit, and controls current supply to an inverter based on a torque command value received from the upper control unit to control driving of the AC motor, and which acquires information on a current-supply state and a rotation state of the AC motor and transmits information on a control state to the upper control unit, wherein:

at least one of the upper control unit and the lower control unit estimates a current estimate value of an estimated phase, which is other than the sensor phase, or a d-q axis current estimate value based on a current detection value of the one phase serving as the sensor phase and an electrical angle of the AC motor, and calculates monitoring information used for monitoring output torque based on the current estimate value, the output torque monitoring section monitors the output torque based on the monitoring information, the monitoring information used for monitoring the output torque is a d-q axis current estimate value, the lower control unit or the upper control unit estimates the d-q axis current estimate value by estimation calculation different from estimation calculation using a current command value, the lower control unit transmits the current detection value of the sensor phase and the electrical angle of the AC motor to the upper control unit, and the upper control unit estimates the d-q axis current estimate value based on the current detection value of the sensor phase and the electrical angle of the AC motor to monitor the output torque.

4. A control apparatus for an AC motor, the control apparatus controlling driving of the AC motor by having a current sensor detect current passing through one phase serving as a sensor phase among multiple phases, the apparatus comprising:

an upper control unit which includes a torque command calculation section calculating a torque command value for the AC motor, and an output torque monitoring section monitoring output torque to determine whether or not the output torque of the AC motor is within a normal range, relative to the torque command value; and a lower control unit which communicates with the upper control unit, and controls current supply to an inverter based on a torque command value received from the upper control unit to control driving of the AC motor, and which acquires information on a current-supply state and a rotation state of the AC motor and transmits information on a control state to the upper control unit, wherein:

at least one of the upper control unit and the lower control unit estimates a current estimate value of an estimated phase, which is other than the sensor phase, or a d-q axis current estimate value based on a current detection value of the one phase serving as the sensor phase and an electrical angle of the AC motor, and calculates monitoring information used for monitoring output torque based on the current estimate value, the output torque monitoring section monitors the output torque based on the monitoring information, the monitoring information used for monitoring the output torque is a d-q axis current estimate value, the lower control unit or the upper control unit estimates the d-q axis current estimate value by estimation calculation using a current command value, the lower control unit estimates the current estimate value of the estimated phase, and transmits the current estimate value of the estimated phase, the current detection value of the sensor phase, and the electrical angle of the AC motor to the upper control unit, and the upper control unit converts the current estimate value of the estimated phase and the current detection value of the sensor phase to d-q axis current estimate values to monitor the output torque.

5. A control apparatus for an AC motor, the control apparatus controlling driving of the AC motor by having a current sensor detect current passing through one phase serving as a sensor phase among multiple phases, the apparatus comprising:

an upper control unit which includes a torque command calculation section calculating a torque command value for the AC motor, and an output torque monitoring section monitoring output torque to determine whether or not the output torque of the AC motor is within a normal range, relative to the torque command value; and a lower control unit which communicates with the upper control unit, and controls current supply to an inverter based on a torque command value received from the upper control unit to control driving of the AC motor, and which acquires information on a current-supply state and a rotation state of the AC motor and transmits information on a control state to the upper control unit, wherein:

at least one of the upper control unit and the lower control unit estimates a current estimate value of an estimated phase, which is other than the sensor phase, or a d-q axis current estimate value based on a current detection value of the one phase serving as the sensor phase and an electrical angle of the AC motor, and calculates monitoring information used for monitoring output torque based on the current estimate value, the output torque monitoring section monitors the output torque based on the monitoring information, the monitoring information used for monitoring the output torque is a d-q axis current estimate value, the lower control unit or the upper control unit estimates the d-q axis current estimate value by estimation calculation using a current command value, the lower control unit estimates the d-q axis current estimate value and transmits the d-q axis current estimate value to the upper control unit, and the upper control unit monitor the output torque based on the d-q axis current estimate value.

6. A control apparatus for an AC motor, the control apparatus controlling driving of the AC motor by having a current sensor detect current passing through one phase serving as a sensor phase among multiple phases, the apparatus comprising:

an upper control unit which includes a torque command calculation section calculating a torque command value for the AC motor, and an output torque monitoring section monitoring output torque to determine whether or not the output torque of the AC motor is within a normal range, relative to the torque command value; and a lower control unit which communicates with the upper control unit, and controls current supply to an inverter based on a torque command value received from the upper control unit to control driving of the AC motor, and which acquires information on a current-supply state and a rotation state of the AC motor and transmits information on a control state to the upper control unit, wherein:

at least one of the upper control unit and the lower control unit estimates a current estimate value of an estimated phase, which is other than the sensor phase, or a d-q axis current estimate value based on a current detection value of the one phase serving as the sensor phase and an electrical angle of the AC motor, and calculates monitoring information used for monitoring output torque based on the current estimate value, and the output torque monitoring section monitors the output torque based on the monitoring information, the monitoring information used for monitoring the output torque is a d-q axis current estimate value, the lower control unit or the upper control unit estimates the d-q axis current estimate value by estimation calculation using a current command value, the lower control unit transmits the current detection value of the sensor phase and the electrical angle of the AC motor to the upper control unit, and the upper control unit estimates the d-q axis current estimate value based on the current detection value of the sensor phase and the electrical angle of the AC motor to monitor the output torque.

\* \* \* \* \*